United States Patent
Rai

(10) Patent No.: US 9,925,936 B2
(45) Date of Patent: Mar. 27, 2018

(54) VEHICLE SERVICE AND USER PROFILE SYNCHRONIZATION

(71) Applicant: TOYOTA INFOTECHNOLOGY CENTER USA, INC., Mountain View, CA (US)

(72) Inventor: Vinuth Rai, San Jose, CA (US)

(*) Notice: Subject to any disclaimer, the term of this patent is extended or adjusted under 35 U.S.C. 154(b) by 291 days.

(21) Appl. No.: 14/570,508

(22) Filed: Dec. 15, 2014

(65) Prior Publication Data

US 2016/0167607 A1 Jun. 16, 2016

(51) Int. Cl.
*B60R 16/037* (2006.01)
*B60W 50/00* (2006.01)
*G06Q 30/06* (2012.01)
*H04L 29/08* (2006.01)

(52) U.S. Cl.
CPC ....... *B60R 16/037* (2013.01); *B60W 50/0098* (2013.01); *G06Q 30/0645* (2013.01); *H04L 67/1095* (2013.01); *H04L 67/306* (2013.01); *H04L 67/34* (2013.01); *B60W 2720/00* (2013.01)

(58) Field of Classification Search
None
See application file for complete search history.

(56) References Cited

U.S. PATENT DOCUMENTS

| | | | | |
|---|---|---|---|---|
| 6,675,082 | B2* | 1/2004 | Galli | B60R 16/037 701/36 |
| 8,635,018 | B2* | 1/2014 | Chia | G07C 5/008 701/25 |
| 8,977,408 | B1* | 3/2015 | Cazanas | H04L 41/082 455/3.03 |
| 2003/0195686 | A1* | 10/2003 | Miller | B60N 2/0252 701/49 |
| 2003/0204296 | A1* | 10/2003 | Galli | B60R 16/037 701/49 |
| 2013/0204455 | A1* | 8/2013 | Chia | G07C 5/008 701/1 |
| 2014/0265479 | A1* | 9/2014 | Bennett | B60N 2/502 297/217.4 |

* cited by examiner

*Primary Examiner* — Shelley Chen
(74) *Attorney, Agent, or Firm* — Burbage Law, P.C.; Jon-Michael Burbage; Elizabeth Ruzich

(57) ABSTRACT

The disclosure includes a system and method for reconfiguring a second vehicle based on one or more preferences of a user without the user directly providing an input to the second vehicle to reconfigure the second vehicle. The method may include wirelessly receiving user profile data at a second vehicle. The user profile data may indicate one or more preference of the user. The method may also include updating one or more settings of the second vehicle based on the user profile data so that the second vehicle is reconfigured based on the one or more preferences of the user.

19 Claims, 25 Drawing Sheets

VEHICLE SERVICE AND USER PROFILE SYNCHRONIZATION

BACKGROUND

The specification relates to providing vehicle service and user profile synchronization. For example, the specification relates to providing user profile synchronization among two or more vehicles.

User needs with regard to their vehicle may change over time. For example, a user may generally need a vehicle that seats four people. However, if the user has a number of friends visiting them, the user may need a vehicle that seats more than four people.

SUMMARY

According to one innovative aspect of the subject matter described in this disclosure, the disclosure may include a system and method for reconfiguring a second vehicle based on one or more preferences of a user without the user directly providing an input to the second vehicle to reconfigure the second vehicle. The method may include wirelessly receiving user profile data at a second vehicle. The user profile data may indicate one or more preference of the user. The method may also include updating one or more settings of the second vehicle based on the user profile data so that the second vehicle is reconfigured based on the one or more preferences of the user.

In general, another innovative aspect of the subject matter described in this disclosure may be embodied in methods that include: providing a flexible vehicle lease in which a user may lease a first vehicle, wherein one or more terms and conditions of the flexible vehicle lease allow the user an option to swap the first vehicle for one of a group of second vehicles at a time chosen by the user, wherein the group of second vehicles is specified by the terms and conditions of the flexible vehicle lease; receiving an input provided to a touchscreen indicating a request of the user to swap the first vehicle for a specified second vehicle at a specified time; determining a geographic location of the specified second vehicle; providing geographic data describing the geographic location of the specified second vehicle; and initiating, by a processor-based computing device programmed to perform the initiation, a wireless transfer of user profile data from the first vehicle to the specified second vehicle via a network so that the specified second vehicle may be reconfigured based on the one or more preferences of the user indicated by the user profile data.

Other aspects include corresponding methods, systems, apparatus, and computer program products for these and other innovative aspects.

The disclosure is particularly advantageous in a number of respects. For example, the system may enable a user to travel in a second vehicle that is wirelessly updated based on the preferences of the user without the user directly providing an input to the second vehicle to reconfigure the second vehicle in accordance with the preferences of the user.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

A problem with current vehicle leases is that the customer is required to drive the same vehicle during the entire term of the lease contract. However, the customer's vehicle needs may change during the term of the lease. Currently, the customer has no way of easily modifying their lease terms so that they can drive different vehicles during the lease term.

This disclosure may include systems, methods and graphical user interfaces to provide a customer with a flexible vehicle lease service that provides the customer with access to multiple vehicles during a lease term for flexible periods of time. The flexible vehicle lease service may be referred to as the "FlexiLease Club." The FlexiLease Club may include intuitive, easy to understand graphical user interfaces (GUI or GUIs) which the customer may access on devices including a touchscreen, such as a smartphone, tablet computer or laptop computer. The customer may use the GUIs to select a vehicle and pickup date for the vehicle. If the customer wants a different vehicle after a period of time, then the customer may use the GUIs to select a different vehicle and delivery date. A service person may deliver the new vehicle at the customer's home on the scheduled delivery date. The customer may change vehicles any number of times.

For example, assume that a customer is going on vacation with his family and needs a vehicle with more cargo space to accommodate the family luggage. The customer may access GUIs on their smartphone and select a different vehicle that will accommodate the family luggage. The customer may also select a delivery date for the vehicle. On the delivery date a service person may arrive at the customer's home with the different vehicle. The customer may then exchange their current vehicle for the different vehicle. The customer's prior vehicle may have included many user profile data that was established while the customer was using that vehicle. The user profile data may include information such as the customer's ergonomic settings, device pairings, radio presets, music streaming preferences, navigation preferences and calendar data. When the customer switches vehicles, their user profile data may be wirelessly synced to a cloud server and downloaded to the customer's different vehicle so that they can use their different vehicle without having to lose the user profile data that was in their prior vehicle.

Example System Overview

Figure 1A:
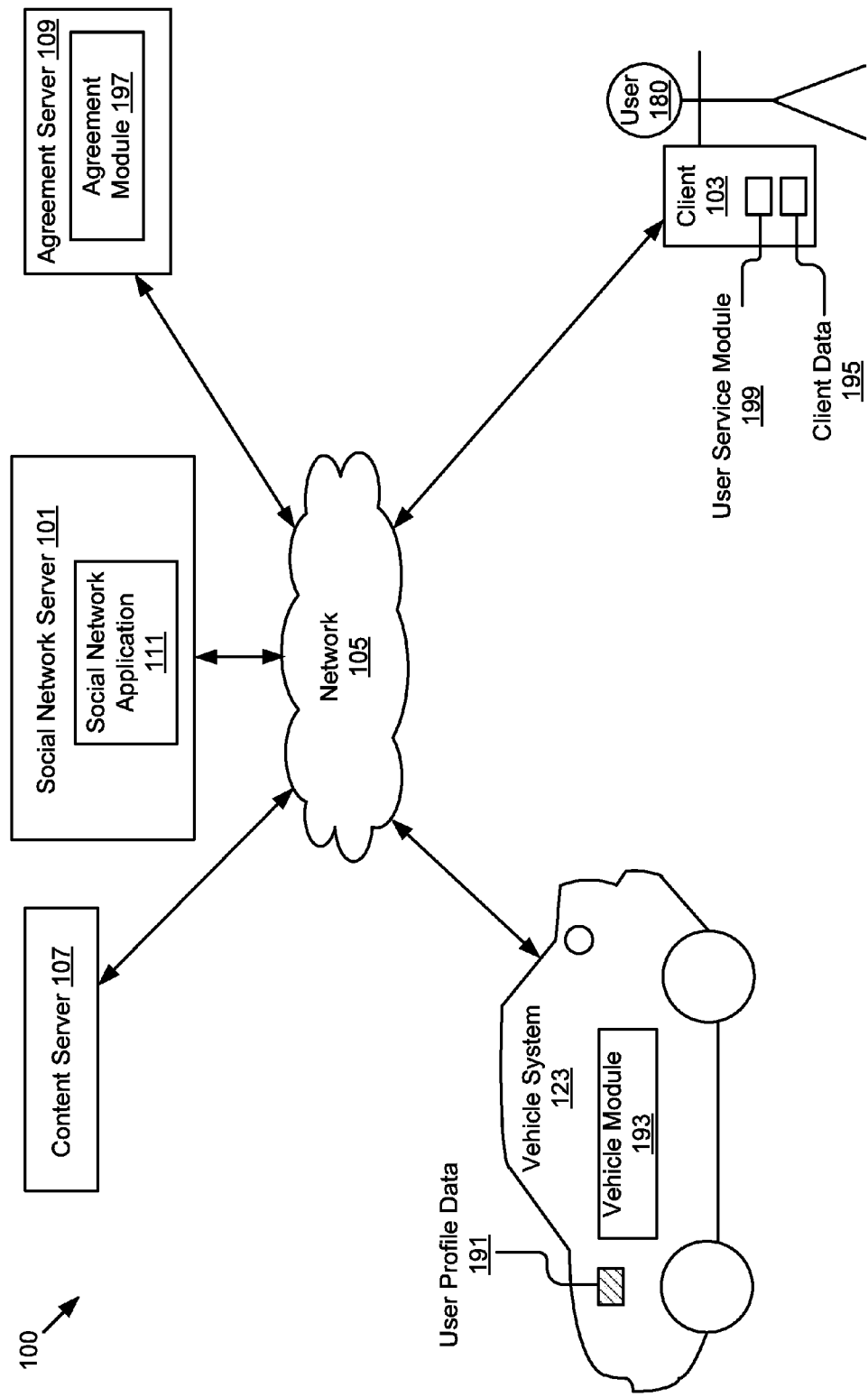
FIG. 1A is a block diagram illustrating an example system for providing a vehicle service and user profile synchronization.

FIG. 1A illustrates a block diagram of one implementation of a system 100 for providing a vehicle service and user profile synchronization. The system 100 may include a client 103, a vehicle system 123, a content server 107, a social network server 101, an agreement server 109 and a network 105. The client 103 and the vehicle system 123 may be accessed by a user 180.

In the illustrated implementation, the client 103, vehicle system 123, content server 107, social network server 101 and agreement server 109 may be communicatively coupled via the network 105. Communication among these elements of the system 100 may be bidirectional.

The system 100 may include other servers or devices not shown in FIG. 1A including, for example, a navigation server for providing navigation data, a weather server for providing weather data and a financial server for processing financial payments.

The client 103 and vehicle system 123 included in FIG. 1A may be used by way of example. While FIG. 1A illustrates one client 103 and one vehicle system 123, the disclosure applies to a system 100 having one or more clients 103 and one or more vehicle systems 123 of varying or same types. Although FIG. 1A illustrates one content server 107, one social network server 101 and one agreement server 109, the disclosure applies to a system 100 having one or more content servers 107, one or more social network servers 101 and one or more agreement servers 109. Although FIG. 1A illustrates one network 105 communicatively coupled to the client 103, vehicle system 123, content server 107, social network server 101 and agreement server 109, in practice one or more networks 105 may be connected.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a Global Positioning Service (GPS) satellite for providing GPS navigation to the client 103 or the vehicle system 123. The network 105 may be a mobile data network such as 3G, 4G, LTE, Voice-over-LTE ("VoLTE"), or any other mobile data network or combination of mobile data networks. In some implementations, the network 105 may include Bluetooth® Low Energy (Bluetooth LE) communication networks or any other Bluetooth® communication network. In some implementations, the network 105 may include dedicated short-range communication (DSRC) networks.

The vehicle system 123 may be a mobile communication node. For example, the vehicle system 123 may be a vehicle (e.g., an automobile, a bus, an airplane, a boat), a general-purpose robot, a special-purpose robot such as an autonomous vehicle or a semi-autonomous vehicle, a drone or any other mobile system. The vehicle system 123 may be an electric vehicle, hybrid vehicle or a vehicle that includes an internal combustion engine.

In some implementations, the vehicle system 123 may include a computing device that includes a memory and a processor. For example, the vehicle system 123 is a vehicle including an onboard computer. In some implementations, the vehicle system 123 may include a mobile client device. For example, the vehicle system 123 may include a tablet, a smartphone, an infotainment system, or another type of computing device.

A user 180 may interact with the vehicle system 123. For example, the user 180 may be a human that travels in the vehicle system 123.

The vehicle system 123 may include hardware or software to enable the vehicle system 123 to wirelessly access the network 105. For example, the vehicle system 123 may include an infotainment system to provide one or more network services to a user 180 of the vehicle system 123. The vehicle system 123 may receive network services data via the network 105. The infotainment system of the vehicle system 123 may use the network services data to provide one or more network services to the user. The network services data may be stored on the content server 107. The network services data may be any data needed to provide the network service to the vehicle system 123. The network services data may include audio data, video data, e-mail data, calendar data or any other data necessary to stream the network services described below. For example, the network services data may include audio data for enabling the user 180 of the vehicle system 123 to stream music via the infotainment system of the vehicle system 123.

In some implementations, the vehicle system 123 may include one or more sensors (not shown), such as a navigation sensor (e.g., a GPS sensor), an infrared detector, a motion detector, a thermostat, a sound detector, and any other type of sensors. For example, the vehicle system 123 may include sensors for measuring one or more of a current time, a current location (e.g., a latitude, longitude, and altitude of a location), an acceleration of the vehicle system 123, a velocity of the vehicle system 123, a fuel tank level of the vehicle system 123, a battery level of the vehicle system 123, an activity of an occupant of the vehicle system 123, etc. The sensors of the vehicle system 123 may include an interior cabin camera, a weight sensor, a carbon monoxide sensor, or any other sensor to detect the activity of the occupant of the vehicle system 123. The sensors of the vehicle system 123 may include a buffer or some other non-transitory memory to store the network services requested by the user of the vehicle system 123.

The vehicle system 123 may include a user profile data 191. The user profile data 191 may include any data associated with the user 180. For example, the user profile data 191 may describe settings preferred by the user 180 when traveling in the vehicle system 123. For example, the user profile data 191 may describe one or more ergonomic settings for the vehicle system 123 for use by the vehicle system 123 when the user 180 is traveling in the vehicle system 123, one or more device pairings for use by the vehicle system 123 when the user 180 is traveling in the vehicle system 123, user account information for one or more network services associated with the user 180 for use by the vehicle system 123 when the user 180 is traveling in the vehicle system 123, one or more settings for a navigation system of the vehicle system 123 for use by the vehicle system 123 when the user 180 is traveling in the vehicle system 123 and one or more electronic calendars for use by the vehicle system 123 when the user 180 is traveling in the vehicle system 123.

In some implementations, the one or more ergonomic settings described by the user profile data 191 may include ergonomic data describing one or more of the following: how a steering wheel of the vehicle system 123 should be adjusted when the user 180 is traveling in the vehicle system 123; how a seat of the vehicle system 123 should be adjusted when the user 180 is traveling in the vehicle system 123; and how one or more mirrors of the vehicle system 123 should be adjusted when the user 180 is traveling in the vehicle system 123.

In some implementations, the one or more device pairing settings described by the user profile data 191 may include device pairing data describing one or more devices that are authorized to pair with the vehicle system 123 by the user 180 and any data or information necessary for the vehicle system 123 to pair with these devices via a wireless communication network such as Bluetooth. The devices which pair with the vehicle system 123 using the device pairing data may include one or more clients 103 associated with the user 180.

In some implementations, the user account information for one or more network services associated with the user 180 may include any data or information necessary for the vehicle system 123 to stream one or more network services associated with the user 180. For example, the vehicle system 123 includes an infotainment system that includes functionality to wirelessly stream one or more network services via the network 105. The vehicle system 123 may include other hardware (e.g., one or more displays, one or more speakers, etc.) or software necessary to enable the user 180 to consume the one or more network services streamed via the network 105.

The network services may include one or more of the following: navigation instructions; streaming audio or video (such as Pandora™, Spotify™, iTunes™, Google Play™, YouTube™, Netflix™, Hulu Plus™, Crackle™, Amazon™ Instant Video, Prime Instant Video, Digital Music Store, Prime Music App Store, etc.); social networking (such as Facebook™, Google+™, LinkedIn™, Tinder™, QQ™, etc.); microblogging (such as Twitter™, Tumblr™, etc.); online chatting (such as Google Chat™, Snapchat™, WhatsApp™, etc.); online content sharing (such as Instagram™, Pinterest™, etc.); e-mail (such as Gmail™, Outlook™, Yahoo! Mail™, etc.); file sharing (such as Dropbox™, Google Drive™, MS OneDrive™, Evernote™ etc.); electronic calendar and scheduling (such as Google™ Calendar, MS Outlook™, etc.); and etc. In some implementations, the client data 195 may include data necessary to enable the user 180 to consume one or more of these networks services via the infotainment system of the vehicle system 123.

In some implementations, the user profile data 191 may include one or more of the following: one or more radio station presets for an infotainment system of the vehicle system 123 describing how the infotainment system settings should be adjusted when the user 180 is traveling in the vehicle system 123; one or more audio equalizer settings for the infotainment system of the vehicle system 123 describing how the infotainment system settings should be adjusted when the user 180 is traveling in the vehicle system 123; one or more thermostat settings or other settings for the climate control system of the vehicle system 123 describing how the climate control system of the vehicle system 123 should be adjusted when the user 180 is traveling in the vehicle system 123; and one or more garage door settings enabling the vehicle system 123 to control operation of one or more garage doors associated with the user 180. In some implementations, the vehicle module 193 may include code and routines to reconfigure elements of the vehicle system 123 based on the user profile data 191. For example, the infotainment system of the vehicle system 123 may be reconfigured to include the radio station presets for the user 180 based on the user profile data 191.

In some implementations, the one or more settings for the navigation system of the vehicle system 123 included in the user profile data 191 may include the user's home address and any data necessary to enable the vehicle system 123 to navigate to the user's home address when the user 180 is traveling in the vehicle system 123.

In some implementations, the one or more electronic calendars for use by the vehicle system 123 when the user 180 is traveling in the vehicle system 123 may be included in the network services of the user 180. Optionally, the one or more electronic calendars may be a local calendar associated with the client 103.

The vehicle system 123 may include a vehicle module 193. The vehicle module 193 may include code and routines configured to reconfigure the vehicle system 123 based on the user profile data 191. For example, the user 180 may swap a first vehicle system 123 for a second vehicle system 123 that is different from the first vehicle system 123. The vehicle module 193 may be an element of the second vehicle system 123. The user 180 may schedule a time to swap the different vehicle systems 123. The vehicle module 193 may monitor the time of day, determine that the user 180 has scheduled a time to swap vehicle systems 123, determine that it is time to synchronize the user profile data 191 from the first vehicle system 123 to the second vehicle system and initiate a download of the user profile data 191 associated to the second vehicle system 123. The vehicle module 193 may initiate a download of the user profile data 191 to the second vehicle system 123 from the agreement server 109. The vehicle module 193 may reconfigure the vehicle system 123 based on the user profile data 191. Alternatively, in some implementations the agreement module 197 of the agreement server 109 may initiate the download of the user profile data 191 to the second vehicle system 123 or the vehicle module 193 of the first vehicle system 123 may initiate the download of the user profile data to the second vehicle system 123. In some implementations, the user service module 199 of the client 103 may initiate the download of the user profile data 191 to the second vehicle system 123.

An example of the vehicle module 193 providing the user profile data 191 to a different vehicle system 123 is described below with reference to FIG. 1B.

In some implementations, the vehicle module 191 may include code and routines configured to provide one or more of the graphical user interfaces ("GUI" or "GUIs") 600, 700, 800, 900, 1000, 1100, 1200, 1300, 1400, 1600 described below with reference to FIGS. 6A-14 and 16. The vehicle module 191 may also include code and routines configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, and the vehicle module 191 may receive this input and take action responsive to this input. In some implementations, the vehicle module 191 may include code and routines configured to provide some or all of the functionality described below with reference to one or more of the GUIs 600, 700, 800, 900, 1000, 1100, 1200, 1300, 1400, 1600.

In some implementations, the vehicle module 193 may include code and routines configured to perform one or more steps of methods 500 or 1500 when executed by a processor such as processor 425 described below with reference to FIG. 4.

An example implementation of the vehicle module 193 will be described in more detail below with reference to FIG. 4.

The client 103 may be a processor-based computing device that includes a processor and a memory. For example, the client 103 may be a personal computer, a laptop computer, a tablet computer, a wearable device, a smartphone, a mobile telephone, a personal digital assistant ("PDA"), a mobile e-mail device, a portable game player, a portable music player, set-top box, a network-connected television, a network-connected home device or any other tangible electronic device capable of accessing the network 105. In some implementations, the wearable device may include, for example, a smartwatch or fitness tracker that communicates via the network 105.

The client 103 may include a user service module 199 and client data 195. The user service module 199 may include code and routines configured to provide client data 195 to one or more vehicle systems 123. For example, the user service module 199 may provide the client data 195 to the vehicle system 123 via Wi-Fi, Bluetooth or some other wireless communication network between the vehicle system 123 and the client 103. In some implementations, the client 103 may be hardwired to a communication unit of the vehicle system 123 and may provide the client data 195 to the vehicle system 123 via this communicative coupling. An example implementation of the communication unit of the vehicle system 123 is described in more detail below with reference to FIG. 4.

In some implementations, the user service module 199 may include code and routines configured to generate one or more of the GUIs 600, 700, 800, 900, 1000, 1100, 1200, 1300, 1400, 1600 described below with reference to FIGS. 6A-14 and 16. The user service module 199 may also include code and routines configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, and the user service module 199 may receive this input and take action responsive to this input. In some implementations, the user service module 199 may include code and routines configured to provide some or all of the functionality described below with reference to one or more of the GUIs 600, 700, 800, 900, 1000, 1100, 1200, 1300, 1400, 1600.

In some implementations, the user service module 199 may include code and routines configured to perform one or more steps of the methods 500, 1500 described below with reference to FIGS. 5A, 5B, 15A and 15B when executed by a processor such as processor 225 described below with reference to FIG. 2.

An example implementation of the user service module 199 is described below in more detail with reference to FIG. 2.

The client data 195 may include any data stored on the client 103. For example, the client data 195 may include e-mail data describing e-mails associated with the user 180, electronic calendar data associated with the user 180, an electronic address book including data describing one or more contacts associated with the user 180 and one or more email addresses, physical mailing addresses, telephone numbers and notes associated with these contacts.

In some implementations, the client data 195 may include user account information for one or more network services associated with the user 180 as described above with reference to the user profile data 191. For example, the client data 195 may include any data or information necessary for the user 180 to access or consume network services via the client 103 or the vehicle system 123.

In some implementations, the client data 195 may be included in the user profile data 191 of the vehicle system 123. For example, the client 103 may establish a Bluetooth connection with the vehicle system 123 and the user service module 199 may provide the client data 195 to the vehicle system 123 via the Bluetooth connection. The vehicle system 123 may store the client data 195 in the user profile data 191. In this way the user 180 may continue to access the client data 195 and user network services associated with the client data 195 while traveling in the vehicle system 123. For example, the user 180 may travel in the vehicle system 123 and continue to use network services associated with the client data 195 via one or more of a head unit, a heads-up display unit or infotainment system of the vehicle system 123.

In some implementations, the client data 195 may include X2V data. X2V data may include any type of object-to-vehicle data. X2V data may include information about the object's position. For example, the client data 195 may include one or more bits of data describing the geographic location of the client 103. In this way, the vehicle system 123 may be able to determine the location of the client 103 relative the vehicle system 123.

In some implementations, the client 103 or the vehicle system 123 may include functionality to determine their relative locations using GPS or wireless signal triangulation (e.g., Wi-Fi triangulation). In some implementations, the X2V data may include one or more bits that are an indication of the source of the data.

In some implementations, one or more of the client 103 and the vehicle system 123 may include hardware or software necessary to communicate via DSRC. DSRC may include one-way or two-way short-range to medium-range wireless communication channels that are designed for automotive use. In some implementations, the DSRC implemented by the vehicle system 123 or the client 103 may use the 5.9 GHz band for transmission.

The social network server 101 may be a hardware server that includes a processor, a memory and network communication capabilities. The social network server 101 may be communicatively coupled to the network 105. The social network server 101 may send and receive data to and from other elements of the system 100 via the network 105.

The social network server 101 may include a social network application 111. The social network application 111 may include code and routines for providing a social network. The social network may be a type of social structure where one or more users 180 may be connected by a common feature. The common feature may include relationships/connections, e.g., friendship, family, work, an interest, etc. The common features may be provided by one or more social networking systems including explicitly defined relationships and relationships implied by social connections with other online users 180, where the relationships form a social graph. In some examples, the social graph may reflect a mapping of these users 180 and how they may be related.

In some implementations, the social network application 111 may generate a social network that may be used for generating suggestions. For example, the user 180 may be experiencing a life event or have an upcoming life event that may indicate that the user 180 may have an interest in switching from a current vehicle system 123 to a different vehicle system 123. For example, the user 180 may have relatives coming to visit and the current vehicle system 123 may not include enough seating to enable the relatives to travel in the current vehicle system 123 with the user 180. In this example, the social network application 111 may work with the vehicle module 193 or the user service module 199 to present an opportunity to the user 180 to switch from the current vehicle system 123 to the different vehicle system 123 that may include enough seating to accommodate the changing needs of the user 180. In this way, the social network application 111 may work with one or more of the vehicle module 193 and the user service module 199 to provide personalized recommendations to the user 180 that are configured to assist the user 180 in switching from a current vehicle system 123 to a different vehicle system 123.

The content server 107 may be a hardware server that includes a processor, a memory and network communication capabilities. The content server 107 may be communicatively coupled to the network 105. The content server 107 may send and receive data to and from other elements of the system 100 via the network 105. For example, the content server 107 may be configured to provide one or more network services to the vehicle system 123 or the client 103.

The agreement server 109 may be a hardware server that includes a processor, a memory and network communication capabilities. The agreement server 109 may be communicatively coupled to the network 105. The agreement server 109 may send and receive data to and from other elements of the system 100 via the network 105. For example, the agreement server 109 may be configured to transmit or manage transmission of the user profile data 191 from a prior vehicle system 123 to a different vehicle system 123 responsive to determining that the user 180 is switching from prior vehicle system 123 to the different vehicle system 123.

The agreement server 109 may include an agreement module 197. The agreement module 197 may include code and routines configured to determine an effective agreement. For example, the agreement module 197 may determine an effective agreement for the user 180 based on inputs provided to one or more GUIs. In some implementations, the effective agreement may be an agreement to lease the vehicle system 123 or switch from a prior vehicle system 123 to a different vehicle system 123.

In some implementations, the agreement module 197 may include code and routines configured to provide graphical data for depicting one or more of the GUIs 600, 700, 800, 900, 1000, 1100, 1200, 1300, 1400, 1600 to one or more of the vehicle system 123 and the client 103. The agreement module 197 may also include code and routines configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, and the agreement module 197 may receive this input and take action responsive to this input. In some implementations, the agreement module 197 may include code and routines configured to provide some or all of the functionality described below with reference to one or more of the GUIs 600, 700, 800, 900, 1000, 1100, 1200, 1300, 1400, 1600.

In some implementations, the agreement module 197 may include code and routines configured to perform one or more steps of methods 500 or 1500 when executed by a processor such as processor 325 described below with reference to FIG. 3.

In some implementations, the agreement server 109 may store one or more of the agreement module 197, the user profile data 191 and the client data 195 in the memory of the agreement server 109.

An example implementation of the agreement module 197 is described below with reference to FIG. 3.

In some implementations, one or more of the vehicle module 193, the user service module 199 and the agreement module 197 may be implemented using hardware including a field-programmable gate array ("FPGA") or an application-specific integrated circuit ("ASIC"). In some other implementations, one or more of the vehicle module 193, the user service module 199 and the agreement module 197 may be implemented using a combination of hardware and software. In some implementations, one or more of the vehicle module 193, the user service module 199 and the agreement module 197 may be stored in a combination of the devices and servers, or in one of the devices or servers.

Figure 1B:
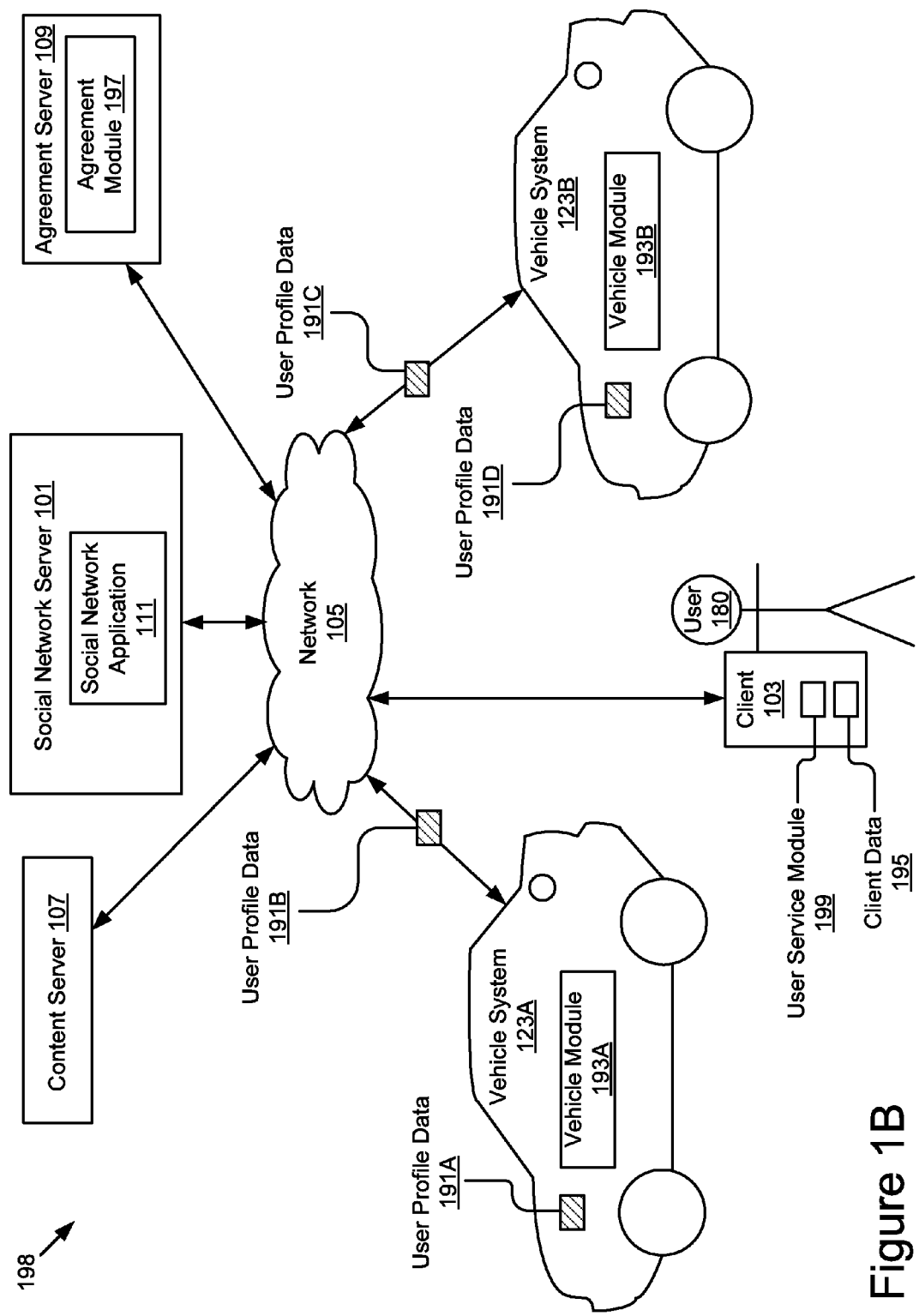
FIG. 1B is a block diagram illustrating an example system for providing a vehicle service and user profile synchronization.

Referring now to FIG. 1B, depicted is a block diagram of one implementation of a system 198 for providing a vehicle service and user profile synchronization. The system 198 may include the client 103, a first vehicle system 123A and a second vehicle system 123B (referred to collectively or individually as the "vehicle system 123" or the "vehicle systems 123"), the content server 107, the social network server 101, the agreement server 109 and the network 105. The client 103 and the vehicle systems 123 may be accessed by a user 180.

In the illustrated implementation, the client 103, vehicle systems 123, content server 107, social network server 101 and agreement server 109 may be communicatively coupled via the network 105. Communication among these elements of the system 100 may be bidirectional.

The system 198 may include other servers or devices not shown in FIG. 1B including, for example, a navigation server for providing navigation data, a weather server for providing weather data and a financial server for processing financial payments.

The client 103, vehicle systems 123, content server 107, social network server 101, agreement server 109 and network 105 may include similar functionality as described above with reference to FIG. 1A, and so the descriptions of these elements will not be repeated here. The social network application 111 and the agreement module 197 include similar functionality as described above with reference to FIG. 1A, and so the descriptions of these elements will not be repeated here. Similarly, the user service module 199 and the client data 195 of the client 103 were described above with reference to FIG. 1A, and so, these descriptions will also not be repeated here.

The first vehicle module 193A and the second vehicle module 193B include similar functionality as the vehicle module 193 described above with reference to FIG. 1A, and so that description will not be repeated here.

As described above with reference to FIG. 1A, the vehicle module 193 may include code and routines configured to provide the user profile data 191 to another vehicle system 123. In FIG. 1B, elements 191A, 191B, 191C and 191D may include the user profile data 191 described above with reference to FIG. 1A at different stages as it is being transmitted from the first vehicle system 123A to the second vehicle system 123B.

In some implementations, the first vehicle module 193A of the first vehicle system 123A or the agreement module 197 may transmit the user profile data 191 to the second vehicle module 193B of the second vehicle system 123B via the network 105. For example, element 191A includes the user profile data 191 when it is stored in the first vehicle system 123A, element 191B includes the user profile data 191 as it is being transmitted to the network 105, element 191C includes the user profile data 191C as it is being transmitted to the second vehicle system 123B and element 191D includes the user profile data 191D when it is stored in the second vehicle system 123B.

Figure 2:
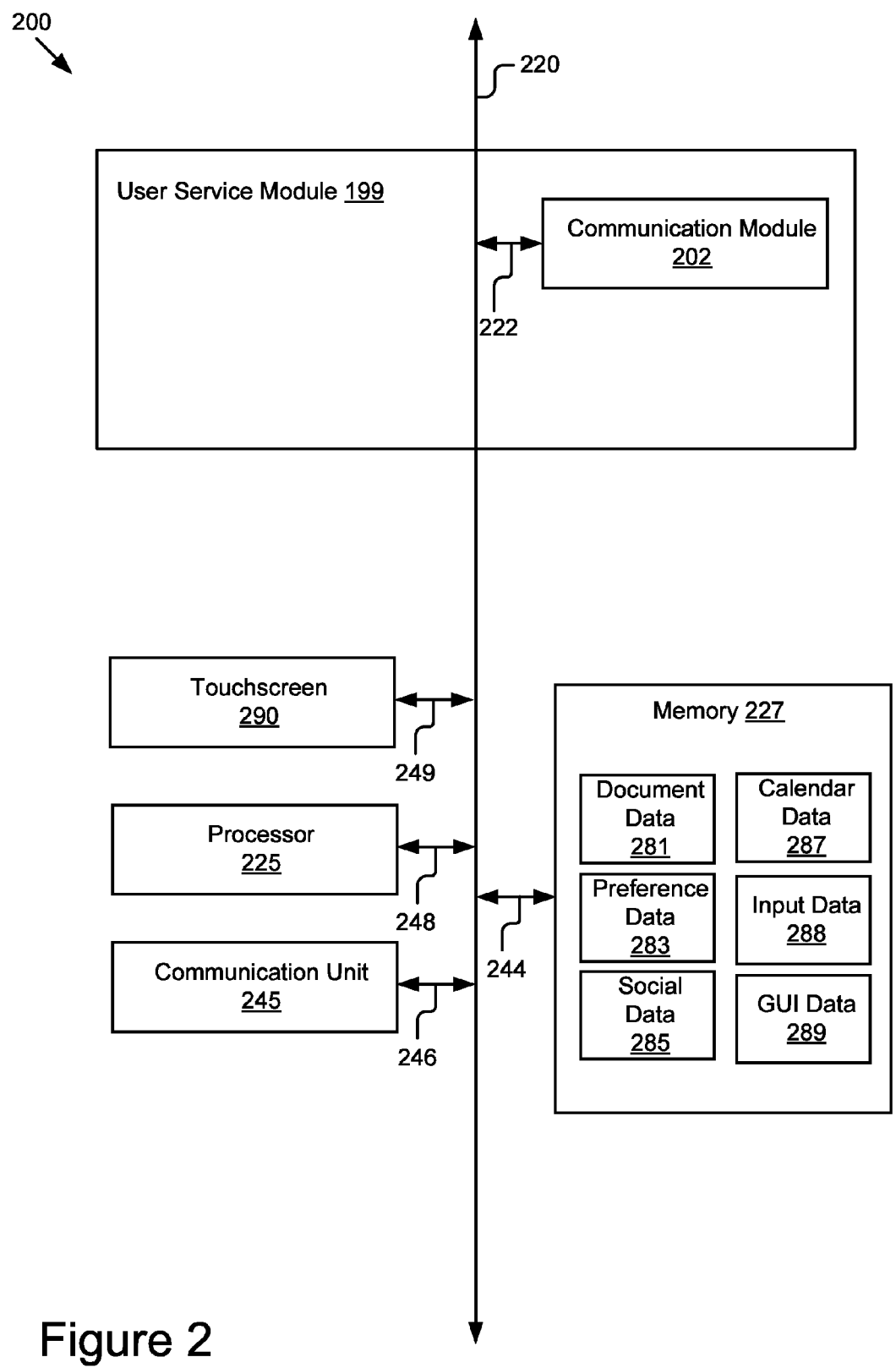
FIG. 2 is a block diagram illustrating an example user service system.

Referring now to FIG. 2, an example implementation of a user service system 200 is depicted. The user service system 200 may include the user service module 199, a touch screen 290, a processor 225, a communication unit 245 and a memory 227. These elements of the user service system 200 may be communicatively coupled by a bus 220. The touchscreen 290 may be communicatively coupled to the bus 220 via signal line 249. The processor 225 may be communicatively coupled to the bus 220 via signal line 248. The communication unit 245 may be communicatively coupled to the bus 220 via signal line 246. The memory 227 may be communicatively coupled to the bus 220 via signal line 244.

In some implementations, the user service system 200 may be a processor-based computing device. For example, the user service system 200 may be the client 103 described above with reference to FIGS. 1A and 1B.

In some implementations, the user service system 200 may be a special-purpose computing device configured to generate one or more of the GUIs 600, 700, 800, 900, 1000, 1100, 1200, 1300, 1400, 1600 described below with reference to FIGS. 6A-14 and 16. In some implementations, the user service system 200 may be a special-purpose computing device configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, and the user service system 200 may receive this input and take action responsive to this input. In some implementations, the user service system 200 may be a special-purpose computing device configured to provide some or all of the functionality described below with reference to one or more of the GUIs 600, 700, 800, 900, 1000, 1100, 1200, 1300, 1400, 1600.

The touchscreen 290 may include an electronic visual display that the user 180 may control through touch or gestures. The touchscreen 290 may include a display for displaying one or more of the GUIs 600, 700, 800, 900, 1000, 1100, 1200, 1300, 1400, 1600. The display of the touchscreen 290 may be configured to receive one or more inputs to the GUIs 600, 700, 800, 900, 1000, 1100, 1200, 1300, 1400, 1600. The touchscreen 290 may include hardware, software or a combination of hardware and software for receiving, detecting and interpreting inputs received from the user 180. In some implementations, the display of the touchscreen 290 may be configured to receive one or more of the inputs described below with reference to methods 500 and 1500 described below with reference to FIGS. 5A, 5B, 15A and 15B.

In some implementations, the user 180 may control or provide inputs to the touchscreen 290 by touching the display of the touchscreen 290 with a stylus or pen configured to provide an input to the touchscreen 290. In some implementations, the user 180 may control or provide inputs to the touchscreen 290 by touching the screen with one or more fingers. The fingers of the user 180 may be bare or gloved in a material configured to provide an input to the touchscreen 290. In some implementations, the touchscreen 290 may include any hardware or software needed to be controlled or determine inputs based on one or more touches provided by the user 180 to the display of the touchscreen 290.

In some implementations, the touchscreen 290 may be an element of a smartphone, tablet computer, wearable device such as a smart watch, touch sensitive monitor or display peripheral. In some implementations, the touchscreen 290 may be an element of a head unit, heads-up display unit or infotainment system included in the vehicle system 123.

The processor 225 may include an arithmetic logic unit, a microprocessor, a general-purpose controller, or some other processor array to perform computations and provide electronic display signals to a display device. The processor 225 may process data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

In some implementations, the user service system 200 may be a special-purpose computing device configured to perform one or more steps of the methods 500, 1500 described below with reference to FIGS. 5A, 5B, 15A and 15B when executed by the processor 225.

The memory 227 may store instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores document data 281, preference data 283, social data 285, calendar data 287, input data 288 and GUI data 289. One or more of the document data 281, the preference data 283, the social data 285, the input data 288 and the calendar data 287 may be included in the client data 195 which may be included in the user profile data 191.

The document data 281 may describe one or more of the documents described below with reference to FIG. 10.

The preference data 283 may describe one or more preferences of the user 180. For example, the preference data may describe the preferences of the user 180 in relation to one or more network services, ergonomic settings for the vehicle system 123 or any other preferences of the user 180. The preferences data 283 may describe one or more preferences the user 180 wants to be implemented when switching from a first vehicle system 123A to a second vehicle system 123B.

The social data 285 may describe data associated with the user 180 interaction with the social network provided by the social network application 111. In one implementation, the social data 285 may describe one or more recommendations for switching from a first vehicle system 123A to a second vehicle system 123B based on the interaction of the user 180 with one or more social networks.

The calendar data 287 may describe one or more electronic calendars for the user 180. For example, the calendar data 287 may describe one or more electronic calendars that are locally stored on the user service system 200. The calendar data 287 may be synchronized with a first vehicle system 123A. The calendar data 287 may be an element of the user profile data 191. In this way the user 180 may access and interact with the electronic calendars of the calendar data 287 when traveling in the vehicle system 123. In some implementations, when the user 180 switches from the first vehicle system 123A to a second vehicle system 123B, the calendar data may be synchronized from the first vehicle system 123A to the second vehicle system 123B. In this way, the user 180 may continue to access and interact with the electronic calendars of the calendar data 287 after the user 180 has switched vehicle systems 123. An example of this is described below with reference to FIG. 16.

The input data 288 may describe one or more inputs provided to one or more of the GUIs 600, 700, 800, 900, 1000, 1100, 1200, 1300, 1400, 1600. For example, the input data 288 may describe an input provided to the touchscreen 290 for one or more of the GUIs 600, 700, 800, 900, 1000, 1100, 1200, 1300, 1400, 1600.

The GUI data 289 may include data for generating one or more GUIs. The GUI data 289 may be configured to generate GUIs that receive input via the touchscreen 290. In some implementations, the GUI data 289 may be configured to generate one or more of the GUIs 600, 700, 800, 900, 1000, 1100, 1200, 1300, 1400, 1600 described below with reference to FIGS. 6A-14 and 16. In some implementations, the user service system 200 may be a special-purpose computing device configured to retrieve the GUI data 289 and render one or more of the GUIs 600, 700, 800, 900, 1000, 1100, 1200, 1300, 1400, 1600.

In some implementations, the GUI data 289 may be configured to generate GUIs that are optimized for display on a smartphone or a tablet computer. In some implementations, the GUIs generated using the GUI data 289 may be optimized to receive touch inputs (e.g., via the touchscreen 290).

In some implementations, the GUI data 289 may be configured to generate webpages. For example, the GUI data 289 may be configured to generate one or more encrypted webpages. In some implementations, the GUI data 289 may be configured to generate one or more webpages that are optimized for electronic financial agreements based on inputs provided to a GUI via the touchscreen 290.

In some implementations, the memory 227 may store the client data 195 described above with reference to FIGS. 1A and 1B.

The communication unit 245 may transmit and receive data to and from the user service system 200. In some implementations, the communication unit 245 may include a port for direct physical connection to the network 105 or to another communication channel. For example, the communication unit 245 may include a USB, SD, CAT-5, or similar port for wired communication with one or more elements of the systems 100, 198. In some implementations, the communication unit 245 may include a wireless transceiver for exchanging data or other communication channels using one or more wireless communication methods, including IEEE 802.11, IEEE 802.16, Bluetooth®, Near Field Communication (NFC) or another suitable wireless communication method.

In some implementations, the communication unit 245 may include a cellular communication transceiver for sending and receiving data over a cellular communication network including via short messaging service (SMS), multimedia messaging service (MMS), hypertext transfer protocol (HTTP), direct data connection, WAP, e-mail, or another suitable type of electronic communication. In some implementations, the communication unit 245 may include a wired port and a wireless transceiver. The communication unit 245 may also provide other conventional connections to the network 105 for distribution of files or media objects using standard network protocols including TCP/IP, HTTP, HTTPS, and SMTP, etc.

In some implementations, the user service module 199 may include code and routines configured to generate one or more of the GUIs 600, 700, 800, 900, 1000, 1100, 1200, 1300, 1400, 1600 described below with reference to FIGS. 6A-14 and 16 using the GUI data 289. In some implementations, the user service module 199 may include code and routines configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, using the touchscreen 290, and the user service module 199 may receive this input and take action responsive to this input. In some implementations, the user service module 199 includes code and routines configured to provide some or all of the functionality described below with reference to one or more of the GUIs 600, 700, 800, 900, 1000, 1100, 1200, 1300, 1400, 1600.

In some implementations, the user service module 199 may include code and routines configured to perform one or more steps of the methods 500, 1500 described below with reference to FIGS. 5A, 5B, 15A and 15B when executed by the processor 225.

In some implementations, the user service module 199 may include a communication module 202. The communication module 202 may include code and routines configured to handle communications between the user service module 199 and the other components of the user service system 200. The communication module 202 may be communicatively coupled to the bus 220 via signal line 222. In some implementations, the communication module 202 may be stored in the memory 227 and accessible and executable by the processor 225.

The communication module 202 may send and receive data, via the communication unit 245, to and from one or more of the entities of the systems 100, 198. For example, the communication module 202 transmits, via the communication unit 245, one or more of the document data 281, the preference data 283, the social data 285 and the calendar data 287 to the first vehicle system 123A.

In some implementations, the communication module 202 may receive touchscreen inputs to a GUI via the communication unit 245. For example, a user 180 may provide an input to the touchscreen 290. The communication unit 245 may receive this input via the touchscreen 290 and transmit input data 288 describing the input to the communication module 202. The communication module 202 may store the input data 288 on the memory 227. In some embodiments, the user service module 199 may take actions responsive to the input data 288 received by the communication module 202. In some implementations, the communication module 202 may cause the communication unit 245 to transmit the input data 288 to the agreement server 109 for use by the agreement module 197.

In some implementations, the communication module 202 receives data from one or more components of the user service system 200 and stores the data in the memory 227. For example, the communication module 202 receives input data 288 from the touchscreen 290 and stores it in the memory 227.

Figure 3:
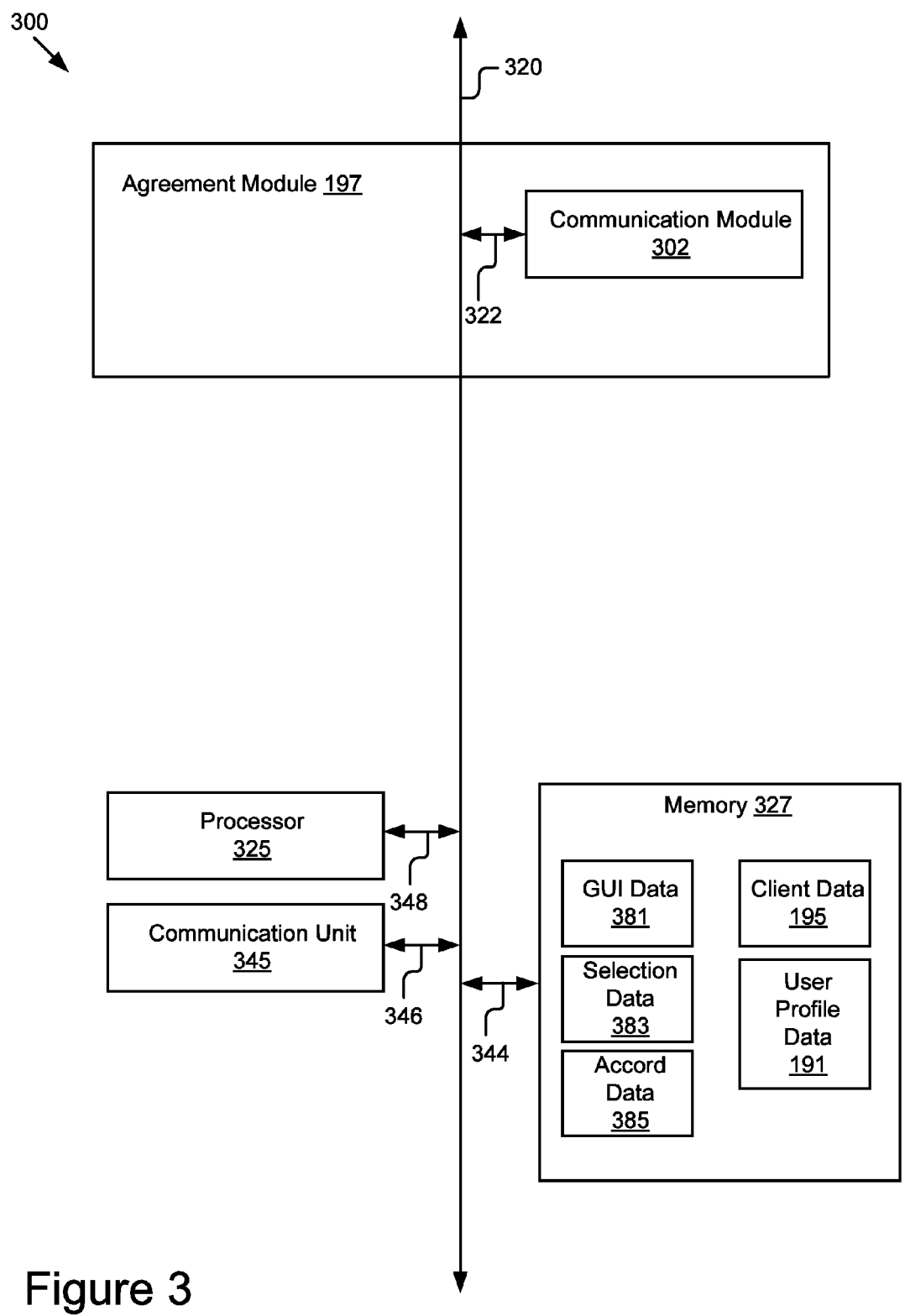
FIG. 3 is a block diagram illustrating an example agreement system.

Referring now to FIG. 3, an example implementation of an agreement system 300 is depicted. The agreement system 300 may include the agreement module 197, a processor 325, a communication unit 345 and a memory 327. These elements of the agreement system 300 may be communicatively coupled by a bus 320. The processor 325 may be communicatively coupled to the bus 320 via signal line 348. The communication unit 345 may be communicatively coupled to the bus 320 via signal line 346. The memory 327 may be communicatively coupled to the bus 320 via signal line 344.

In some implementations, the agreement system 300 may be a processor-based computing device. For example, the agreement system 300 may be the agreement server 109 described above with reference to FIGS. 1A and 1B.

In some implementations, the agreement system 300 may be a special-purpose computing device configured to generate one or more of the GUIs 600, 700, 800, 900, 1000, 1100, 1200, 1300, 1400, 1600 described below with reference to FIGS. 6A-14 and 16. In some implementations, the agreement system 300 may be a special-purpose computing device configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, and the agreement system 300 may receive this input and take action responsive to this input. In some implementations, the agreement system 300 may be a special-purpose computing device configured to provide some or all of the functionality described below with reference to one or more of the GUIs 600, 700, 800, 900, 1000, 1100, 1200, 1300, 1400, 1600.

The processor 325, the communication unit 345 and the memory 327 include similar functionality as the processor 225, the communication unit 245 and the memory 227 described above with reference to FIG. 2, and so, these descriptions will not be repeated here.

In some implementations, the agreement system 300 may be a special-purpose computing device configured to perform one or more steps of the methods 500, 1500 described below with reference to FIGS. 5A, 5B, 15A and 15B when executed by the processor 325.

As illustrated in FIG. 3, the memory 327 stores GUI data 381, selection data 383, accord data 385, client data 195 and user profile data 191. The client data 195 and the user profile data 191 were described above with reference to FIGS. 1A and 1B, and so, these descriptions will not be repeated here. The GUI data 381 may include similar data as the GUI data 289 described above with reference to FIG. 2, and so, that description will not be repeated here.

The selection data 383 may describe one or more selections of the user 180. For example, the selection data 383 may describe one or more selections of the user 180 when interacting with one or more of the GUIs 600, 700, 800, 900, 1000, 1100, 1200, 1300, 1400, 1600 described below with reference to FIGS. 6A-14 and 16. In some implementations, the selection data 383 may describe one or more of the selections or user inputs of methods 500, 1500 described below with reference to FIGS. 5A, 5B, 15A and 15B. For example, the selection data 383 may describe the service level selection, vehicle selection, calendar input or the accord input described below with reference to FIGS. 5A and 5B. These selections or inputs may be provided by the user 180 to the touchscreen 290 of the user service system 200.

The accord data 385 may describe an accord associated with the user 180. For example, the accord data 385 may describe an accord of the user 180 to lease the first vehicle system 123A. The accord data 385 may describe the terms and conditions of the accord. The accord data 385 may provide evidence of the accord as provided to the touchscreen 290 of the user service system 200. In another example, the accord data 385 may describe an accord of the user 180 to switch from the first vehicle system 123A to the second vehicle system 123B.

In some implementations, one or more of the selection data 383 and the accord data 385 may include some or all of the input data 288 described above with reference to FIG. 2.

In some implementations, the agreement module 197 may include code and routines configured to generate one or more of the GUIs 600, 700, 800, 900, 1000, 1100, 1200, 1300, 1400, 1600 described below with reference to FIGS. 6A-14 and 16 using the GUI data 381. In some implementations, the agreement module 197 may include code and routines configured to receive inputs via one or more of the GUIs 600, 700, 800, 900, 1000, 1100, 1200, 1300, 1400, 1600 and take actions responsive to these inputs. For example, the user 180 may provide an input to a service level GUI 600 described below with reference to FIGS. 5A-6C, using a touchscreen 290 of the user service system 200, and the agreement module 197 may receive input data 288 describing this input. The agreement module 197 may store the input data in the memory 327 as selection data 383. The agreement module 197 may take action responsive to the selection data 383. In some implementations, the agreement module 197 may include code and routines configured to provide some or all of the functionality described below with reference to one or more of the GUIs 600, 700, 800, 900, 1000, 1100, 1200, 1300, 1400, 1600.

In some implementations, the agreement module 197 may include code and routines configured to perform one or more steps of the methods 500, 1500 described below with reference to FIGS. 5A, 5B, 15A and 15B when executed by the processor 325.

In some implementations, the agreement module 197 may include a communication module 302. The communication module 302 may be code and routines configured to handle communications between the agreement module 197 and the other components of the agreement system 300. In some implementations, the communication module 302 may be stored in the memory 327 and accessible and executable by the processor 325. The communication module 302 may be communicatively coupled to the bus 320 via signal line 322. The communication module 302 of the agreement module 197 provides similar functionality as the communication module 202 of the user service module 199 described above with reference to FIG. 2, and so, that description will not be repeated here.

Figure 4:
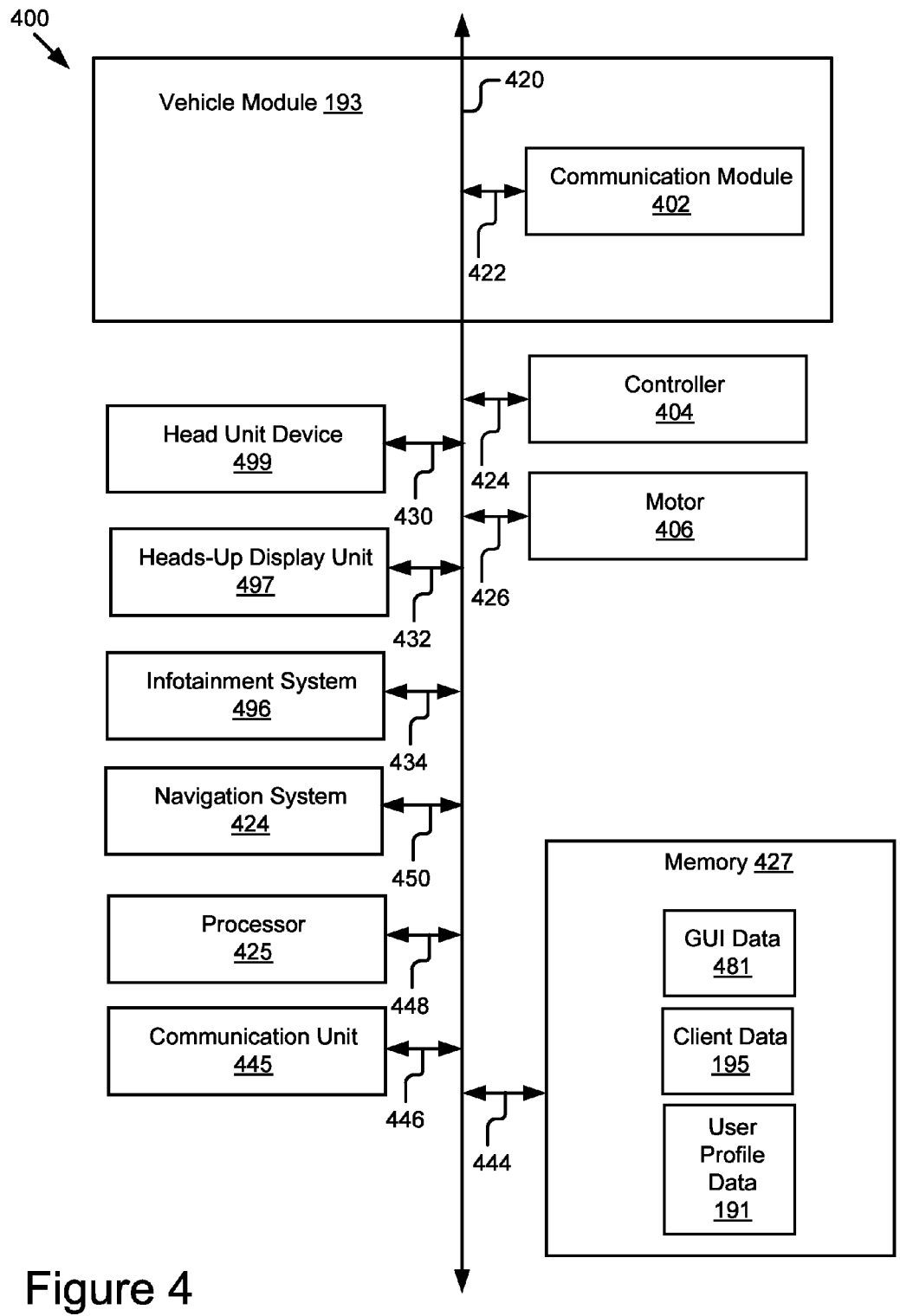
FIG. 4 is a block diagram illustrating an example vehicle service system.

Referring now to FIG. 4, an example implementation of a vehicle service system 400 is depicted. The vehicle service system 400 may include the vehicle module 193, a controller 404, a motor 406, a head unit device 499, a heads-up display unit 497, an infotainment system 496, a navigation system 424, a processor 425, a communication unit 445 and a memory 427. These elements of the vehicle service system 400 may be communicatively coupled by a bus 420. The controller 404 may be communicatively coupled to the bus 420 via signal line 424. The motor 406 may be communicatively coupled to the bus 420 via signal line 426. The head unit device 499 may be communicatively coupled to the bus 420 via signal line 430. The heads-up display unit 497 may be communicatively coupled to the bus 420 via signal line 432. The infotainment system 496 may be communicatively coupled to the bus 420 via signal line 434. The navigation system 424 may be communicatively coupled to the bus 420 via signal line 450. The processor 425 may be communicatively coupled to the bus 420 via signal line 448. The communication unit 445 may be communicatively coupled to the bus 420 via signal line 446. The memory 427 may be communicatively coupled to the bus 420 via signal line 444.

In some implementations, the vehicle service system 400 may be a processor-based computing device. For example, the vehicle service system 400 may be an onboard computer system of the vehicle system 123 described above with reference to FIGS. 1A and 1B.

In some implementations, the vehicle service system 400 may be a special-purpose computing device configured to generate one or more of the GUIs 600, 700, 800, 900, 1000, 1100, 1200, 1300, 1400, 1600 described below with reference to FIGS. 6A-14 and 16. In some implementations, the vehicle service system 400 may be a special-purpose computing device configured to receive inputs via one or more of the GUIs 600, 700, 800, 900, 1000, 1100, 1200, 1300, 1400, 1600 and take actions responsive to these inputs. For example, the user 180 may provide an input to a calendar GUI 1600 described below with reference to FIG. 16, and the vehicle service system 400 may receive this input and take action responsive to this input. In some implementations, the vehicle service system 400 may be a special-purpose computing device configured to provide some or all of the functionality described below with reference to one or more of the GUIs 600, 700, 800, 900, 1000, 1100, 1200, 1300, 1400, 1600.

The processor 425, the communication unit 445 and the memory 427 include similar functionality as the processor 225, the communication unit 245 and the memory 227 described above with reference to FIG. 2, and so, these descriptions will not be repeated here.

In some implementations, the vehicle service system 400 may be a special-purpose computing device configured to perform one or more steps of the methods 500, 1500 described below with reference to FIGS. 5A, 5B, 15A and 15B when executed by the processor 425.

The motor 406 may be an electric motor. The motor 406 may be an element of a vehicle. For example, the motor 406 may be an element of the vehicle system 123. In some implementations the motor 406 is a servo motor or some other electric motor. Although only one motor 406 is depicted in FIG. 4, in practice the vehicle service system 400 may include one or more motors 406.

In some implementations, the motors 406 may be installed in the vehicle to control one or more ergonomic settings of the vehicle. For example, the driver's seat of the vehicle may include one or more motors to control the ergonomic configuration of the driver's seat.

The controller 404 may be a controller for controlling the operations of the motors 406. The vehicle may include one or more controllers 404. The controller 404 may use the user profile data 191 to reconfigure the ergonomic configuration of the vehicle based on the ergonomic settings indicated by the user profile data 191. For example, assume that the user 180 switched from the first vehicle to a second vehicle. The driver's seat of the second vehicle may be reconfigured to match or be similar to the driver's seat of the first vehicle based on the user profile data 191. The controller 404 and the motor 406 may reconfigure other elements of the second vehicle so that the second vehicle has the same or similar ergonomic settings as the first vehicle.

The head unit device 499 may include a hardware device configured to provide the user 180 control of entertainment media and network services provided by the vehicle service system 400. For example, the vehicle service system 400 is an element of the first vehicle system 123A and the head unit device includes functionality to enable the user 180 to control the streaming of content from the content server 107 via the network 105. The content may include one or more network services.

The heads-up display unit 497 may include hardware for displaying three-dimensional (3D) graphical data in front of a user such that they do not need to look away from the road to view the graphical data. For example, the heads-up display unit 497 may include a physical screen or it may project the graphical data onto a transparent film that is part of the windshield of the vehicle system 123 or part of a reflector lens. In some implementations, the heads-up display unit 497 is included as part of the vehicle system 123 during the manufacturing process or is later installed. In other implementations, the heads-up display unit 497 is a removable device. In some implementations, the graphical data may adjust a level of brightness to account for environmental conditions, such as night, day, cloudy, brightness, etc.

The graphical data used by the heads-up display unit 497 may be stored on the memory 427. For example, the graphical data used by heads-up display unit 497 may be included in the GUI data 481 stored on the memory 427. The heads-up display unit 497 may receive graphical data for display from the vehicle module 193 or the communication unit 445. For example, the heads-up display unit 497 receives GUI data 481 to cause the heads-up display unit 497 to display two dimensional or three dimensional renderings of one or more of the GUIs 600, 700, 800, 900, 1000, 1100, 1200, 1300, 1400, 1600 described below with reference to FIGS. 6A-14 and 16. The heads-up display unit 497 may display graphics as three-dimensional Cartesian coordinates (e.g., with x, y, z dimensions).

The infotainment system 496 may include an in-vehicle infotainment (IVI) system. The infotainment system 496 may include one or more hardware devices to provide one or more of the following: audio entertainment; audiovisual entertainment; automotive navigation; and one or more network services. The content provided by the infotainment system 496 may be locally stored on the memory 427 or streamed to the vehicle service system 400 via the network 105. For example, the vehicle service system 400 is included in the first vehicle system 123A and the infotainment system 496 streams one or more network services from the content server 107 via the network 105.

The navigation system 424 may include an automotive navigation system configured to provide a navigation service. For example, the navigation system 424 may provide one or more of navigation instructions, maps, points of interest, ratings for points of interest and reviews for points of interest. In some embodiments, the navigation system 424 may be an element of the infotainment system 496 or the head unit device 499.

As illustrated in FIG. 4, the memory 427 stores GUI data 481, client data 195 and user profile data 191. The client data 195 and the user profile data 191 were described above with reference to FIGS. 1A and 1B, and so, these descriptions will not be repeated here. The GUI data 481 may include similar data as the GUI data 289 described above with reference to FIG. 2, and so, that description will not be repeated here.

One or more of the head unit device 499, infotainment system 496 and the navigation system 424 may include a touchscreen for receiving inputs and selections from a user 180. The inputs and selections may be described by input data or selection data stored on the memory 427 by the communication unit 445 or the communication module 402.

In some implementations, the vehicle module 193 may include code and routines configured to generate one or more of the GUIs 600, 700, 800, 900, 1000, 1100, 1200, 1300, 1400, 1600 described below with reference to FIGS. 6A-14 and 16 using the GUI data 481. In some implementations, the vehicle module 193 may include code and routines configured to receive inputs via one or more of the GUIs 600, 700, 800, 900, 1000, 1100, 1200, 1300, 1400, 1600 and take actions responsive to these inputs. For example, the user 180 may provide an input to a calendar GUI 1600 described below with reference to FIG. 16 using a touchscreen of the infotainment system 496. The vehicle module 193 may take action responsive to this input. In some implementations, the vehicle module 193 may include code and routines configured to provide some or all of the functionality described below with reference to one or more of the GUIs 600, 700, 800, 900, 1000, 1100, 1200, 1300, 1400, 1600.

In some implementations, the vehicle module 193 may include code and routines configured to perform one or more steps of the methods 500, 1500 described below with reference to FIGS. 5A, 5B, 15A and 15B when executed by the processor 425.

In some implementations, the vehicle module 193 may include a communication module 402. The communication module 402 may be code and routines configured to handle communications between the vehicle module 193 and the other components of the vehicle service system 400. In some implementations, the communication module 402 may be stored in the memory 427 and accessible and executable by the processor 425. The communication module 402 may be communicatively coupled to the bus 420 via signal line 422. The communication module 402 of the vehicle module 193 provides similar functionality as the communication module 202 of the user service module 199 described above with reference to FIG. 2, and so, that description will not be repeated here.

Figure 5A:
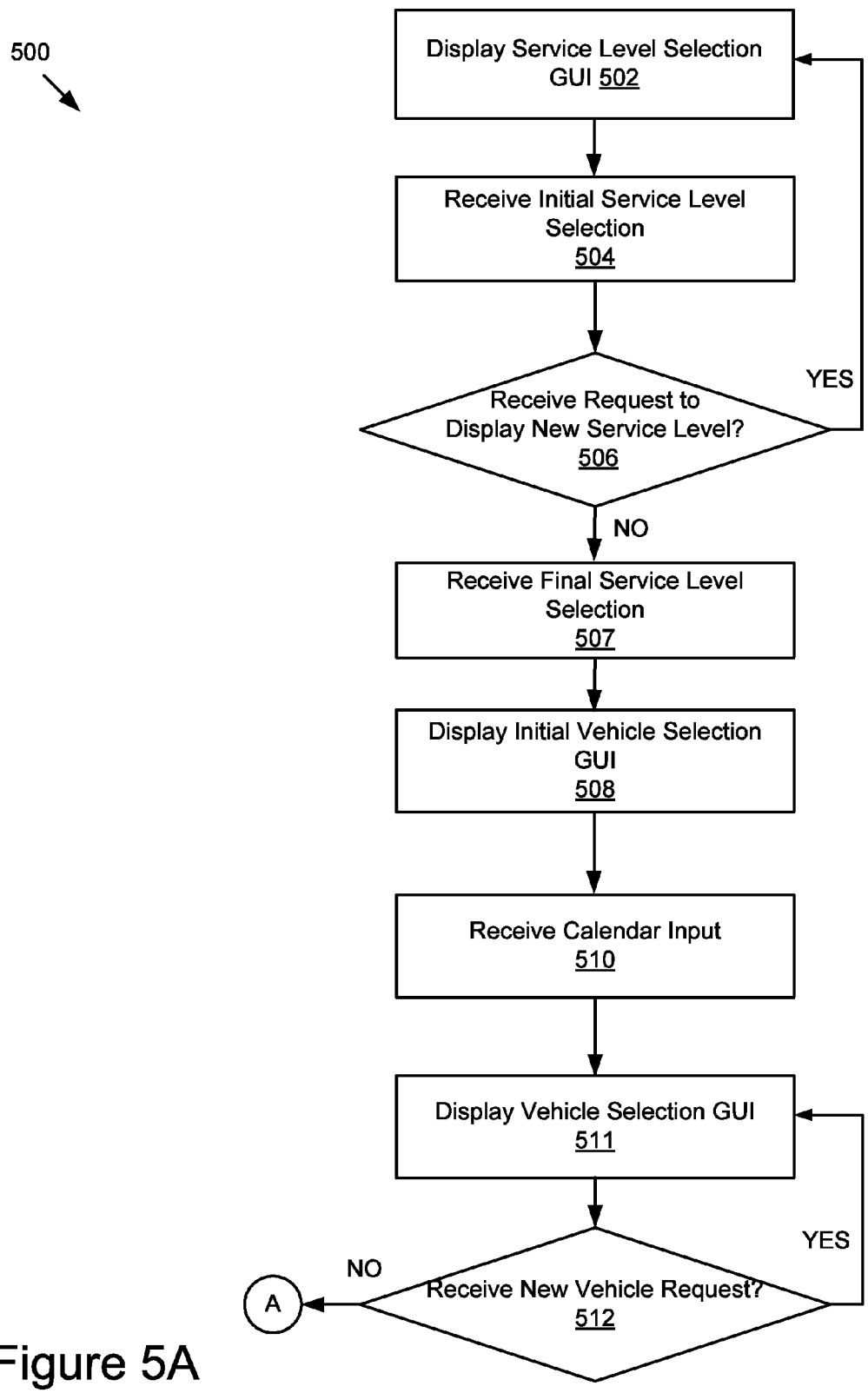
FIGS. 5A and 5B are a flowchart of an example method for updating document data.
Figure 5B:
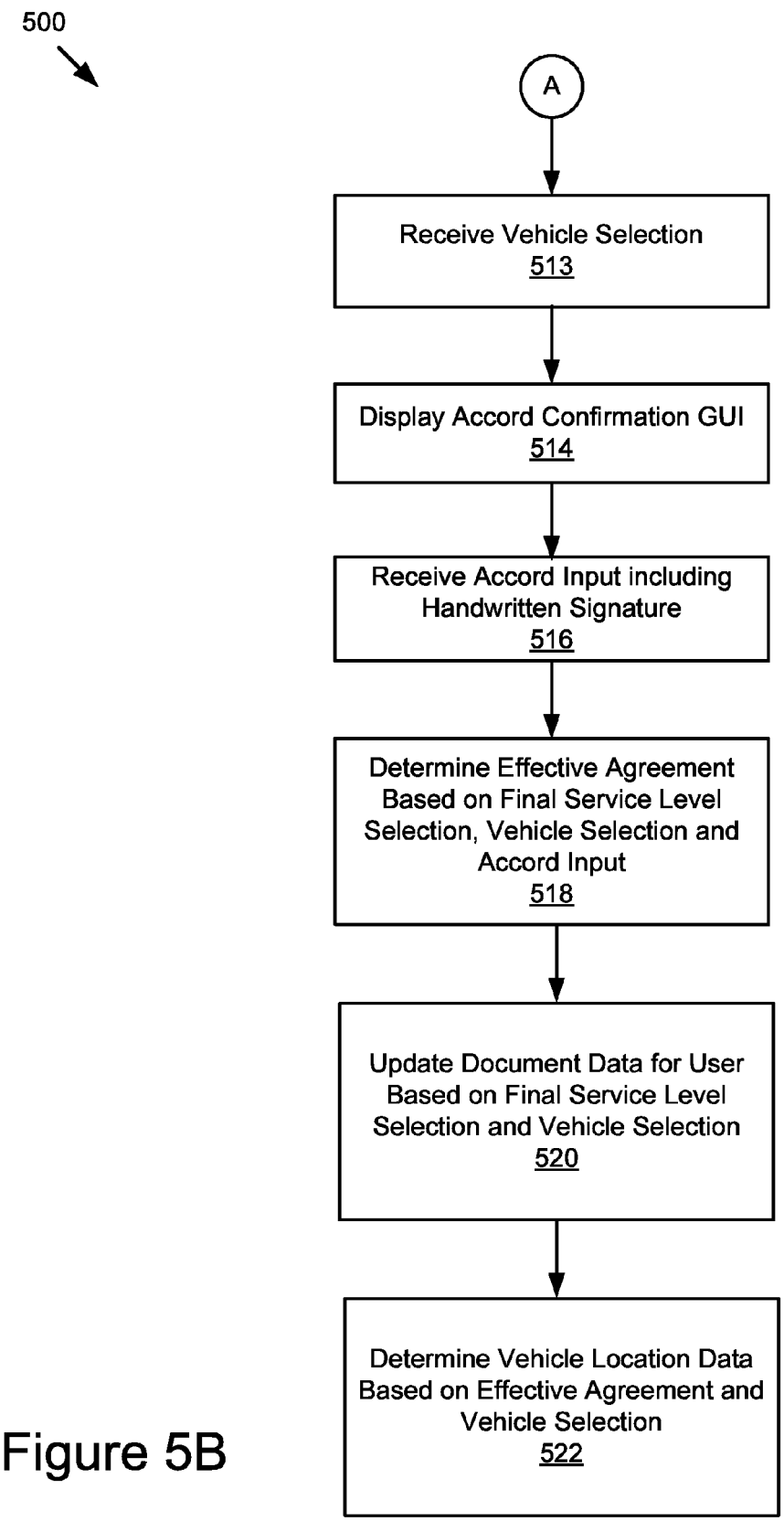

FIGS. 5A and 5B are a flowchart of an example method 500 for updating document data. At block 502 a service level selection GUI is displayed. An example of a service level selection GUI 600 is depicted in depicted in FIG. 6A.

At block 504 a service level request is received. For example, with reference to FIG. 6A, graphical element 682 indicates that "Tier 1" is selected because the typeface for "Tier 1" is in bold font. "Tier 1" is in bold font because a service level request was received in which a user 180 placed their finger on graphical element 682 to select the "Tier 1" service level. This is an example of receiving a service level request as described by block 504 of FIG. 5A.

Referring back to FIG. 5A, at block 506 a determination is made regarding whether a new service level request is received. For example, referring to FIG. 6A, graphical element 682 indicates that "Tier 1" is selected because the typeface for "Tier 1" is in bold font. Referring now to FIG. 6B, element 684 indicates that "Tier 2" is selected because the typeface for "Tier 2" is in bold font while the typeface for "Tier 1" is no longer in bold font. The service level selection GUI 600 may be different in FIG. 6B versus FIG. 6A because a user has provided a new service level request to the GUI 600 by placing their finger on graphical element 684 to select "Tier 2."

Referring back to FIG. 5A, if a new service level request is received at block 506, then the method 500 proceeds to block 502 so that the service level selection GUI may be refreshed to display new graphical data corresponding to the received request. For example, with reference to FIG. 6B, the GUI 600 may be refreshed to change the typeface so that "Tier 2" is in bold font and to remove the bold font for "Tier 1." Also note that new vehicles are displayed in graphical element 615 in FIG. 6B when compared to FIG. 6A. The vehicles of "Tier 2" in FIG. 6B may be more expensive when compared to the vehicles of "Tier 1" in FIG. 6A.

Referring back to FIG. 5A, if a new service level request is not received at block 504, then the method 500 may proceed to block 507. At block 507 a final service level selection is received. For example, referring to FIG. 6B, a user 180 may select graphical element 620 to indicate that they have selected "Tier 2" as their final service level selection.

Referring back to FIG. 5A, at block 508 an initial vehicle selection GUI is displayed. At block 510 a calendar input may be received. For example, referring to FIG. 7A, a user 180 may use graphical element 730 to provide a calendar input to indicate the period of time when the vehicle associated with the agreement is to be used by the user 180. The agreement module 197 may make a determination about which vehicles are available based on the calendar input and an inventory of available vehicles.

Referring back to FIG. 5A, at block 511 the vehicle selection GUI may be displayed. In some implementations, the vehicle selection GUI may graphically depict one or more vehicles from the inventory of available vehicles that are available based on the calendar input and the final service level selection provided by the user 180 to the touchscreen 290. An example of the vehicle selection GUI 700 according to some implementations is depicted in FIG. 7B.

At block 512 a determination may be made regarding whether a new vehicle request is received. For example, referring to FIG. 7B, a determination is made regarding whether the user has selected graphical elements 735 or 740 to indicate that they would like a different vehicle displayed.

If a new vehicle request is received at block 512, then the method 500 may proceed to block 511. If a new vehicle request is not received at block 512, then the method may proceed to block 513 depicted in FIG. 5B.

Referring now to FIG. 5B, at block 513 a determination may be made regarding whether a vehicle selection is received. For example, referring to FIG. 7B, a determination may be made regarding whether the user 180 has selected graphical element 720.

Figure 8A:
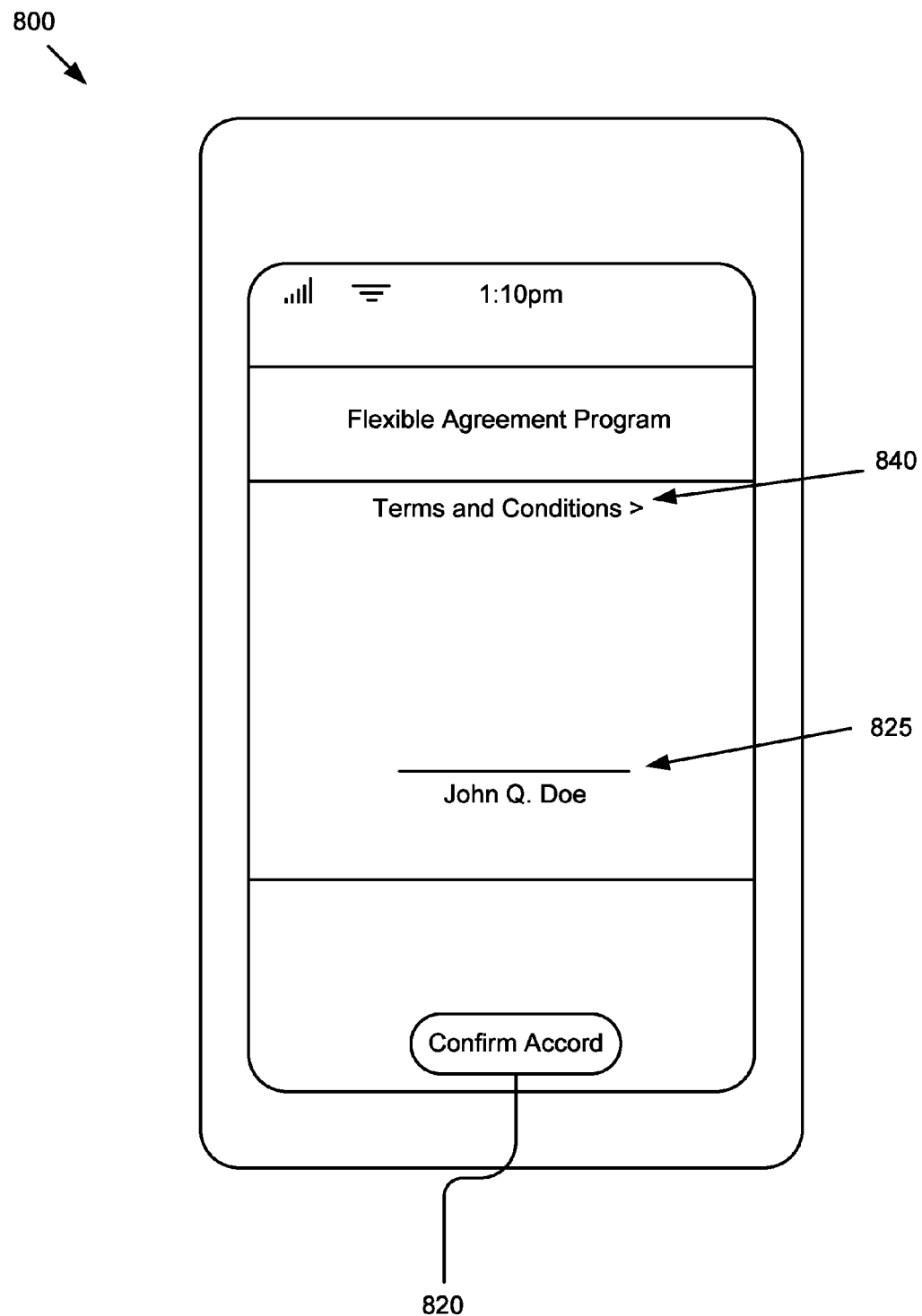
FIGS. 8A and 8B are graphic representations of an example accord confirmation graphical user interface.

Referring back to FIG. 5B, at block 514 an accord confirmation GUI may be displayed. An example of the accord confirmation GUI 800 according to some implementations is depicted in FIG. 8A.

Referring back to FIG. 5B, at block 516 a determination may be made regarding whether an accord input including a handwritten signature is received. For example, referring to FIG. 8B, a determination may be made regarding whether the user 180 has provided a handwritten signature as indicated by graphical element 830 and selected graphical element 820. In some implementations, graphical element 820 is not selectable until one or more inputs corresponding to a valid graphical element 830 are received by the agreement module 197. For example, graphical element 820 may not be selectable until: (1) the user 180 has signed the touchscreen 290 with their finger; (2) the user service module 199 has transmitted input data 288 corresponding to the signature of the user 180 via the network 105; and (3) the agreement module 197 has received the input data 288 and determined that it corresponds to a signature.

Referring back to FIG. 5B, at block 518 an effective agreement may be determined. The effective agreement may include one or more terms and conditions. The terms and conditions of the effective agreement may be viewable by the user 180 by selecting graphical element 840 depicted in FIG. 8B. In some implementations, the effective agreement may be determined based on one or more of the terms and conditions, the final service level selection, the vehicle selection and the accord input. In some implementations, the final service level selection, vehicle selection and accord input may be required to determine an effective agreement. In some implementations, the effective agreement may be determined by the agreement module 197 based on receipt of input data 288 describing the final service level selection, vehicle selection and accord input. For example, the user 180 provides input to the touchscreen 290 corresponding to the input data 288 describing one or more of the final service level selection, vehicle selection and accord input. In some implementations, the input data 288 received by the agreement module 197 may describe the user's 180 acceptance or agreement to the terms and conditions.

At block 520 document data 281 may be updated. In some implementations, the document data 281 may be stored on the agreement server 109 and accessible via the client 103. In some implementations, the agreement module 197 may update the document data 281 based in part on one or more of the final service level selection and the vehicle selection. For example, the document data includes an electronic copy of an owner's manual, insurance paperwork, vehicle registration information and the terms and conditions of the effective agreement. The owner's manual, insurance paperwork and vehicle registration information may be associated with the vehicle selection of the user 180. For example, the user 180 may have selected a Toyota Prius® when providing the vehicle selection and the owner's manual may be the owner's manual for the Toyota Prius®. The vehicle selection and the owner's manual may be associated with any make or model of vehicle.

Figure 11A:
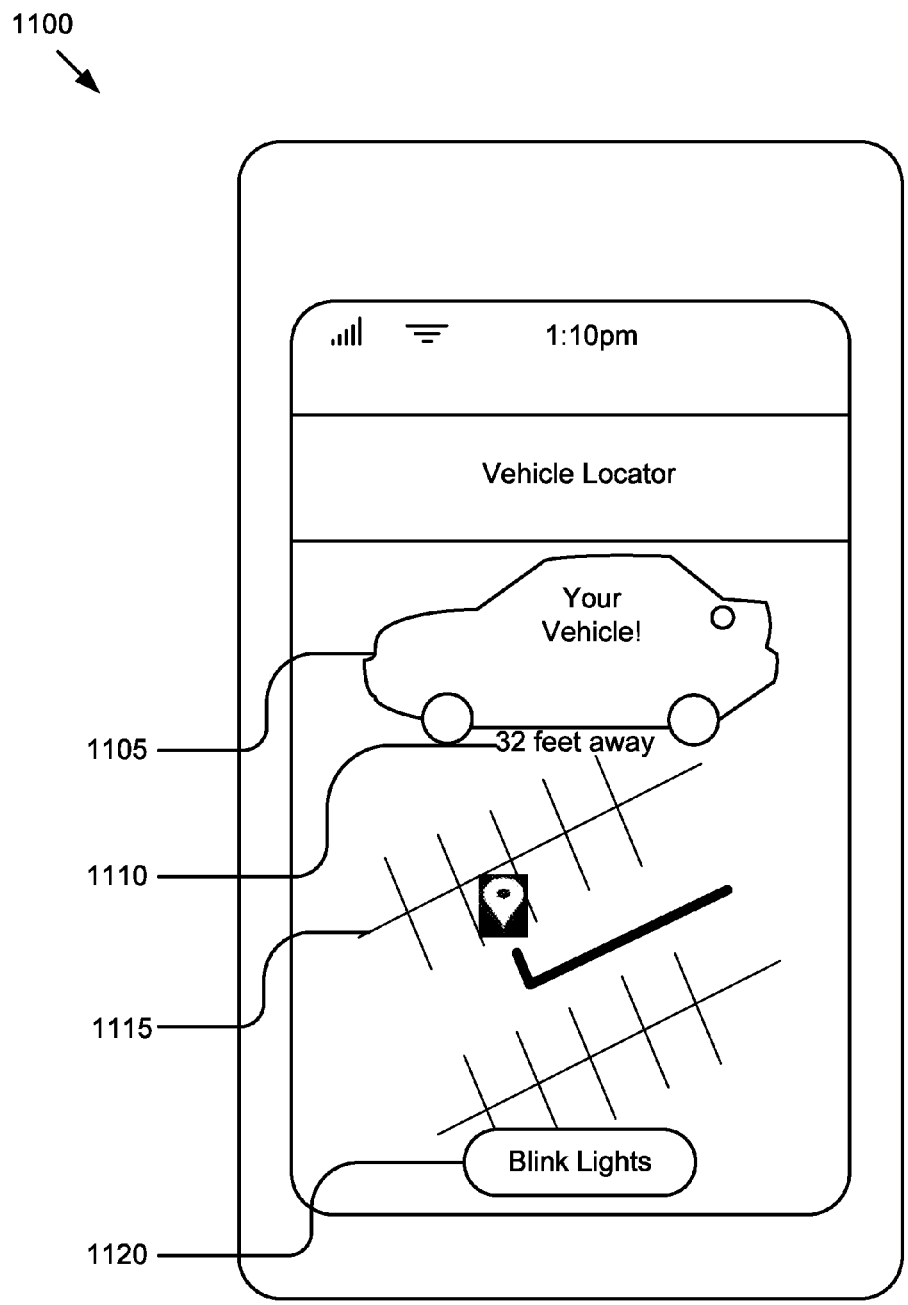
FIGS. 11A-11C are graphic representations of an example vehicle locator graphical user interface.
Figure 11B:
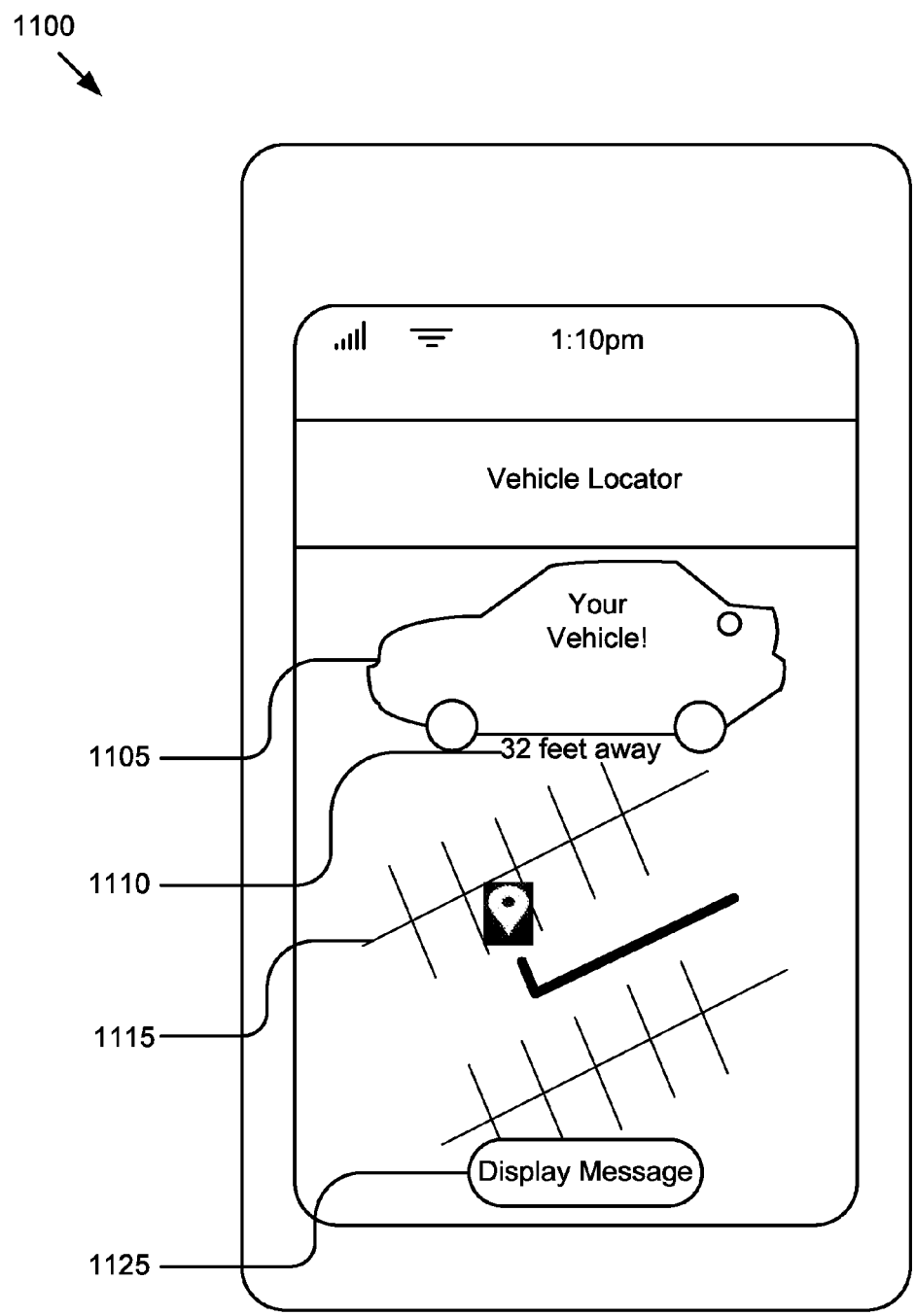
Figure 11C:
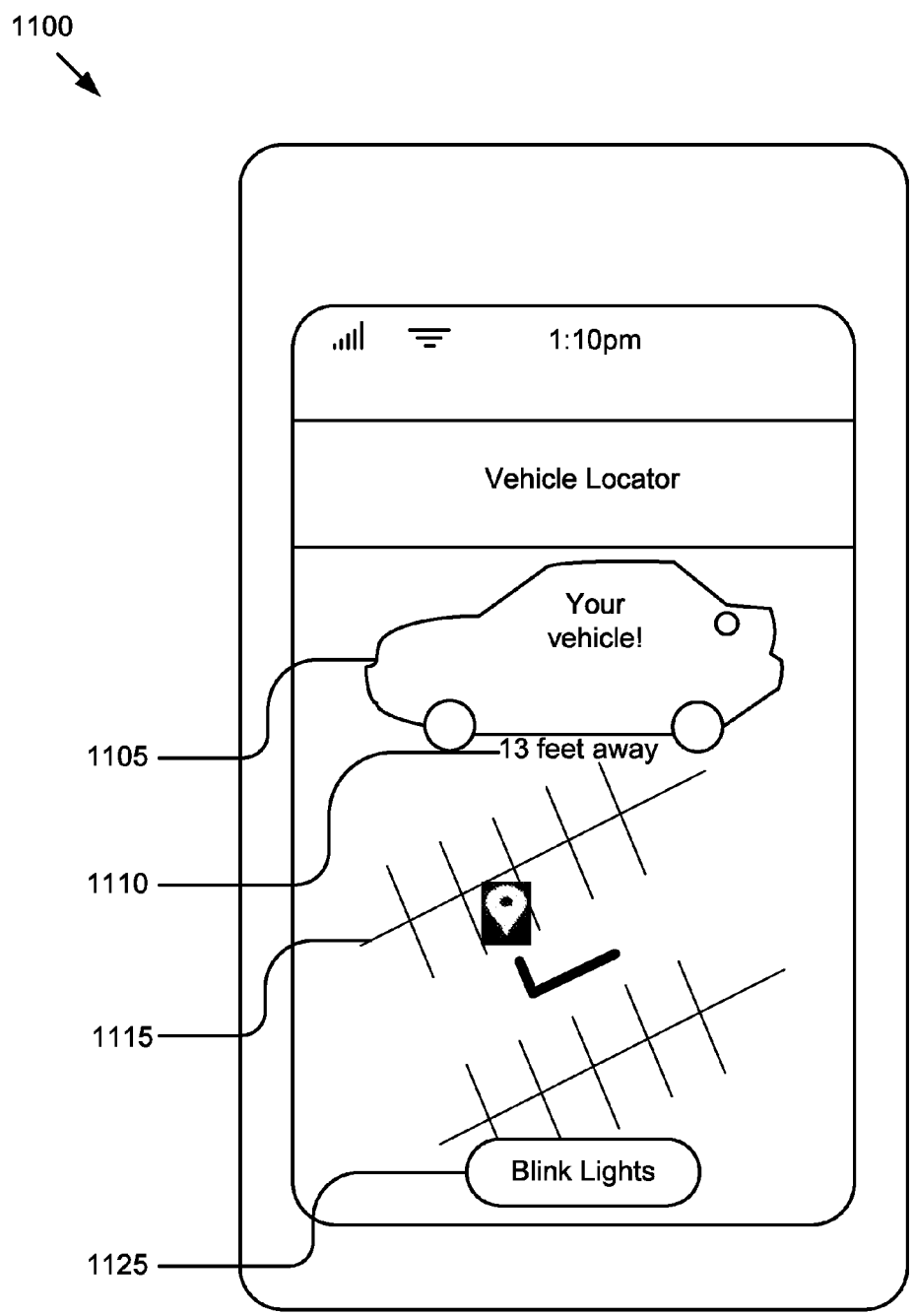

At block 522 vehicle location data may be determined. The vehicle location data may describe the geographic location of the vehicle associated with the vehicle selection and the effective agreement. For example, the vehicle location data may be used by a map service of the client 103 (e.g., the client 103 is a smartphone running a map application such as Google Maps® or Nokia Here Maps®) to display the geographic location of a vehicle which has been leased by the user 180. An example of the use of the vehicle location data according to some implementations is depicted in FIGS. 11A-11C.

Figure 6A:
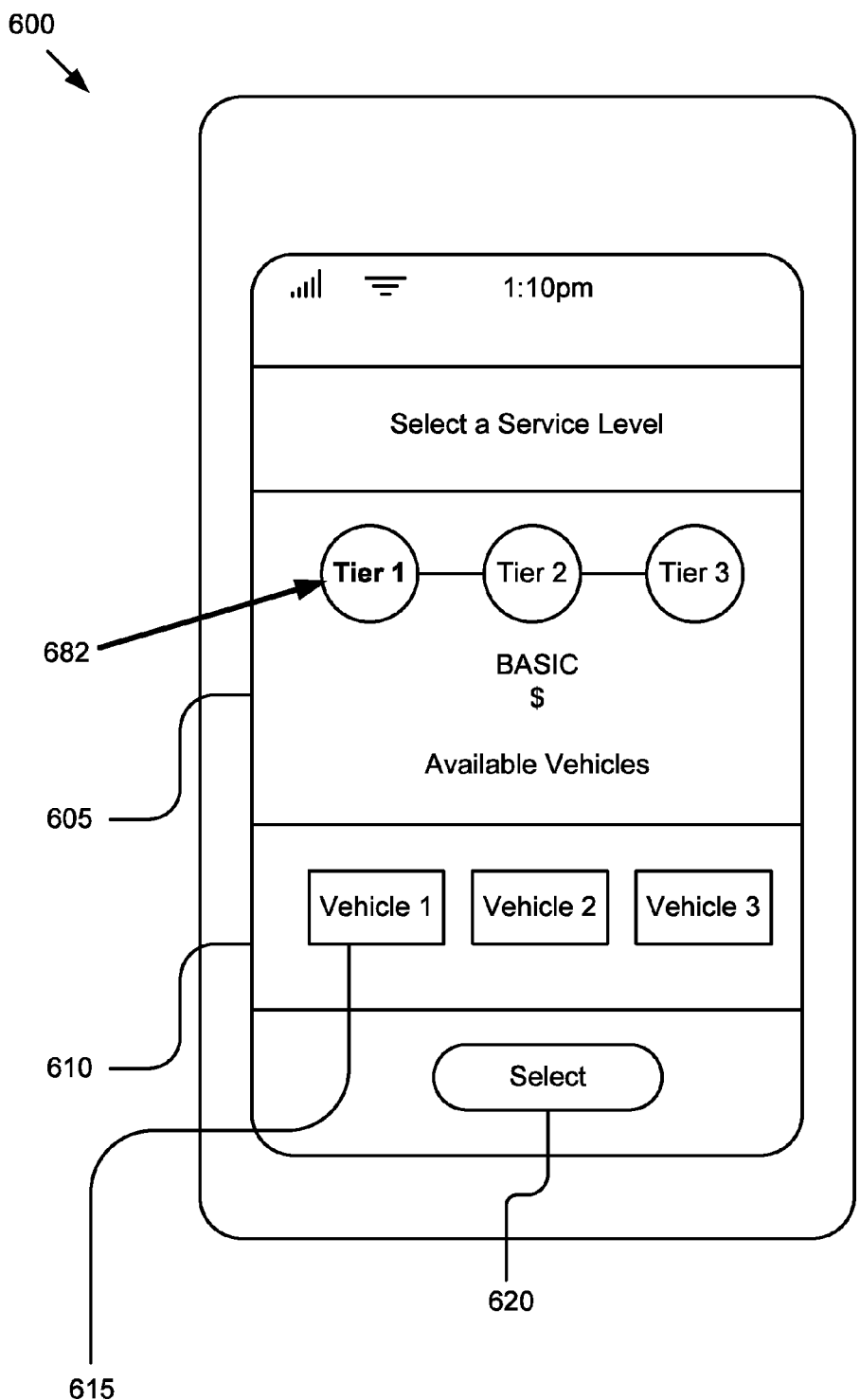
FIGS. 6A-6C are graphic representations of an example service level selection graphical user interface.
Figure 6B:
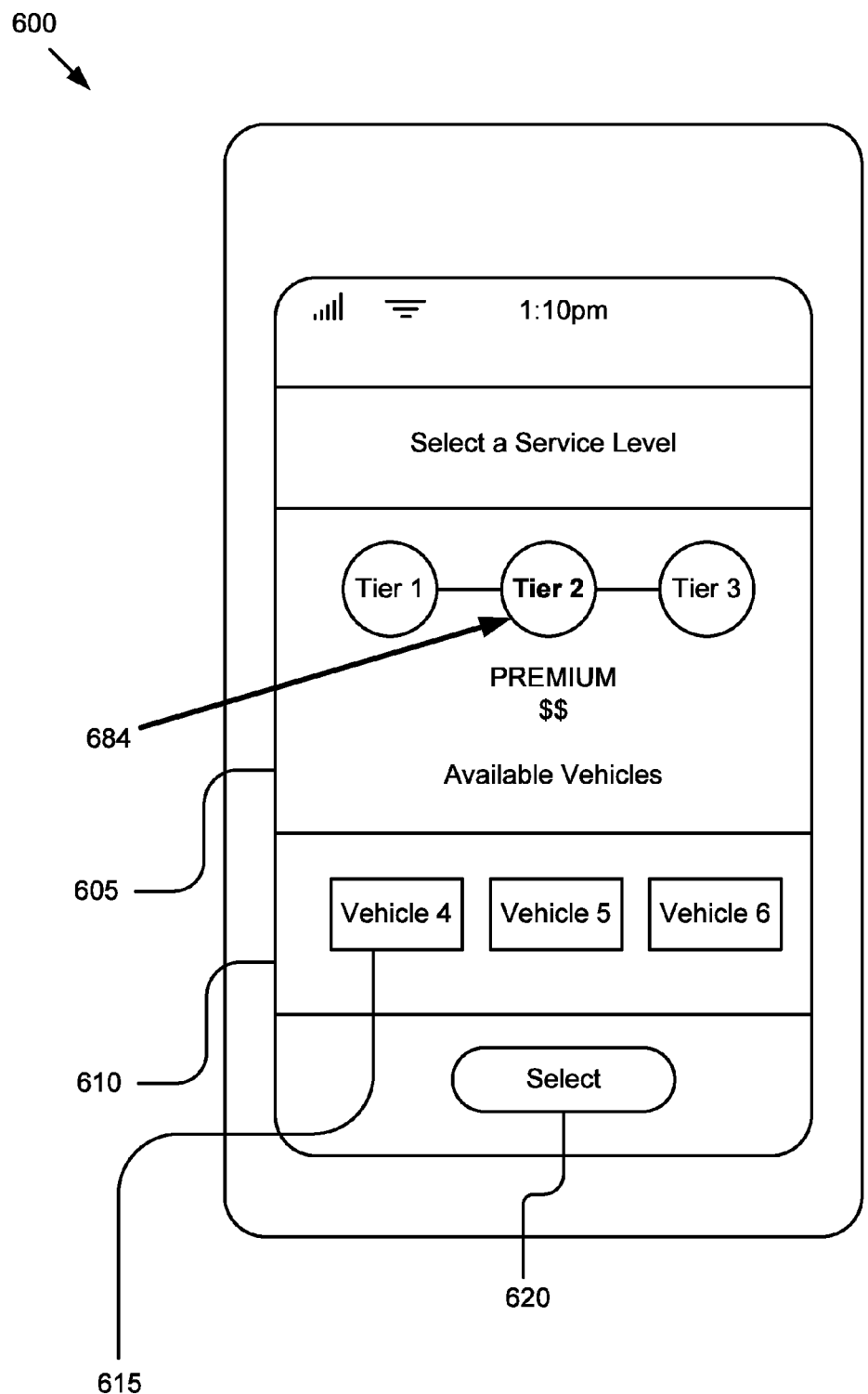
Figure 6C:
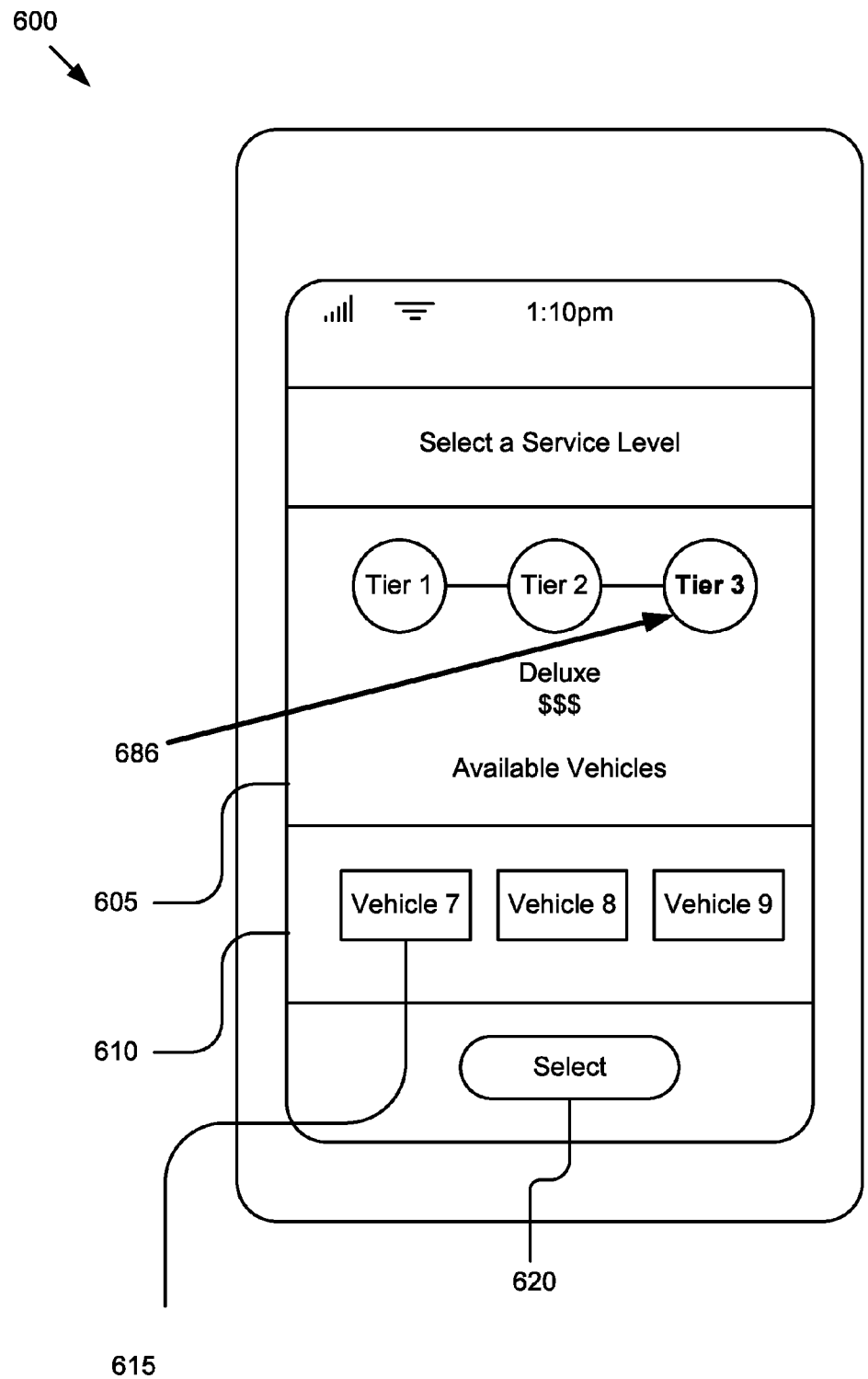

Referring now to FIGS. 6A-6C, depicted are graphic representations of an example service level selection GUI 600. Referring to FIG. 6A, graphical element 605 depicts a region for selecting a service level. Graphical element 682 indicates that "Tier 1" is currently selected. Tier 1 may be a basic tier. The basic tier may be the least expensive service level in terms of cost relative to the other tiers. Graphical element 610 may be examples of the vehicles available to the user 180 if they select the service level indicated by the graphical element selected in 605. For example, in Tier 1 the following example vehicles may be available: Vehicle 1, Vehicle 2 and Vehicle 3. The vehicles may be represented by a graphical element 615 for each vehicle. Graphical element 620 may be a graphical button that may be selected to indicate the final service level selection. For example, if the user 180 wants to select Tier 1 as indicated in FIG. 6A, then the user 180 may select graphical element 620 using the touchscreen 290.

Referring to FIG. 6B, graphical element 605 depicts a region for selecting a service level. Graphical element 684 indicates that "Tier 2" is currently selected. Tier 2 may be a premium tier. The premium tier may be the intermediate service level in terms of cost relative to the other tiers. In other words, Tier 2 may be more expensive than Tier 1 and less expensive that Tier 3. Graphical element 610 may be examples of the vehicles available to the user 180 if they select the service level indicated by the graphical element selected in 605. For example, in Tier 2 the following example vehicles may be available: Vehicle 4, Vehicle 5 and Vehicle 6. The vehicles of Tier 2 may be more expensive in terms of market value, luxurious, exclusive or have greater prestige as measured by public perception or marketing efforts when compared to the vehicles of Tier 1. The vehicles may be represented by a graphical element 615 for each vehicle. Graphical element 620 may be a graphical button that may be selected to indicate the final service level selection. For example, if the user 180 wants to select Tier 2 as indicated in FIG. 6B, then the user 180 may select graphical element 620 using the touchscreen 290.

Referring to FIG. 6C, graphical element 605 depicts a region for selecting a service level. Graphical element 686 indicates that "Tier 3" is currently selected. Tier 3 may be a deluxe tier. The deluxe tier may be the most expensive service level in terms of cost relative to the other tiers. In other words, Tier 3 may be more expensive than Tier 1 and Tier 2. Graphical element 610 may include examples of the vehicles available to the user 180 if they select the service level indicated by the graphical element selected in 605. For example, in Tier 3 the following example vehicles are available: Vehicle 7, Vehicle 8 and Vehicle 9. The vehicles of Tier 3 may be more expensive in terms of market value, luxurious, exclusive or have greater prestige as measured by public perception or marketing efforts when compared to the vehicles of Tier 1 and Tier 2. The vehicles may be represented by a graphical element 615 for each vehicle. Graphical element 620 may be a graphical button that may be selected to indicate the final service level selection. For example, if the user 180 wants to select Tier 3 as indicated in FIG. 6C, then the user 180 may select graphical element 620 using the touchscreen 290.

Referring to FIGS. 6A-6C, in some embodiments the service level selection GUI 600 is displayed on a smartphone, tablet computer, laptop computer with a touchscreen 290 or any other client 103 suitable for displaying the service level selection GUI 600. The user 180 may provide an input to the touchscreen 290 to select the service level, e.g., Tier 1, Tier 2 or Tier 3. The user 180 may select different service levels to consider the relative costs and vehicles available for the different service levels. In some embodiments, a monthly service fee is displayed in region 605 for each service level. In some embodiments, the graphical elements of the vehicles 615 displayed in region 610 include graphical representations which resemble or are visually similar to the vehicles available for the selected service level. When the user 180 decides which service level to select, the user 180 may provide the final service level by selecting graphical element 620. In some implementations, the costs of the service level may be a monthly fee processed by a financial server.

Figure 7A:
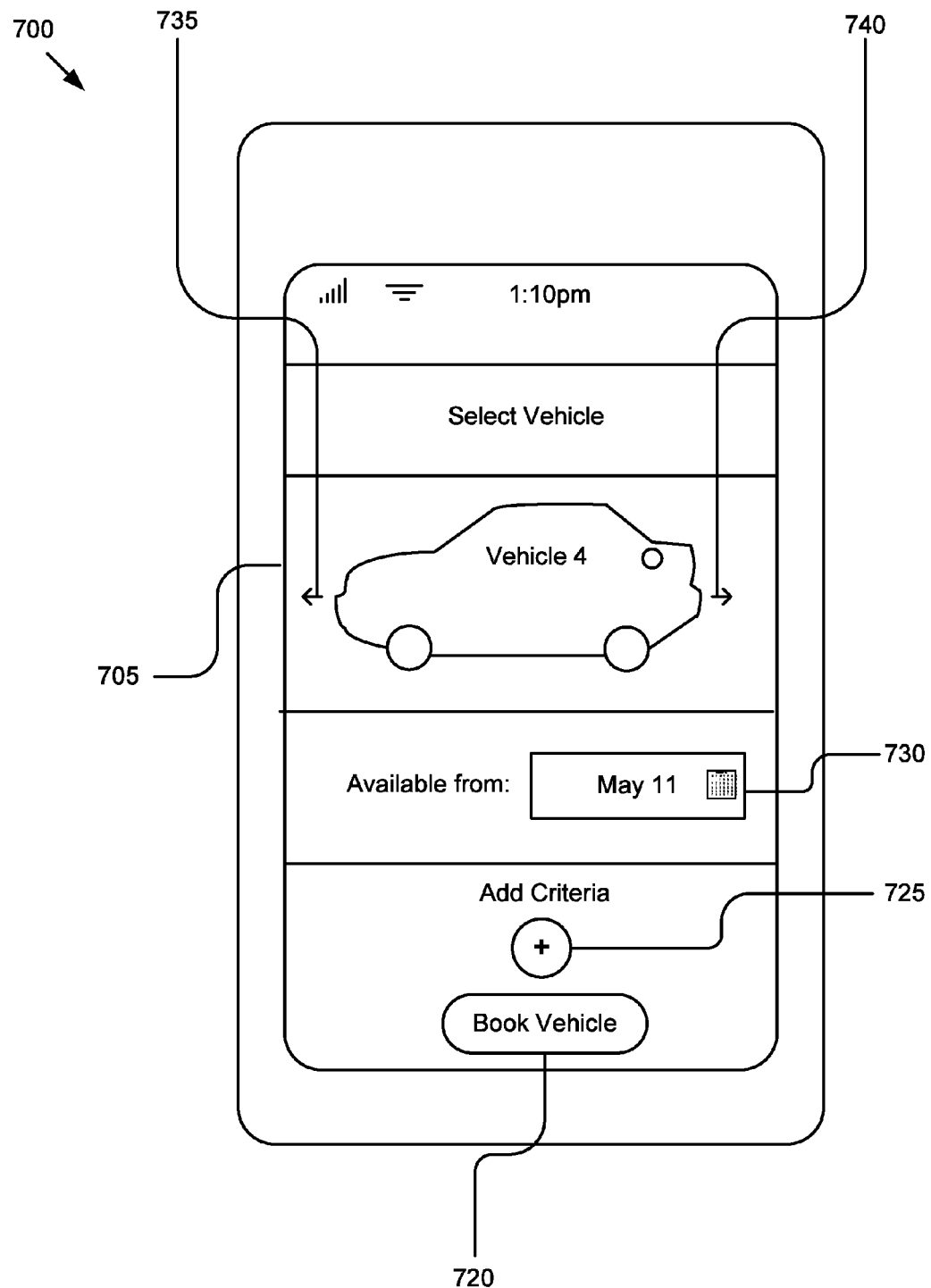
FIGS. 7A and 7B are graphic representations of an example vehicle selection graphical user interface.
Figure 7B:
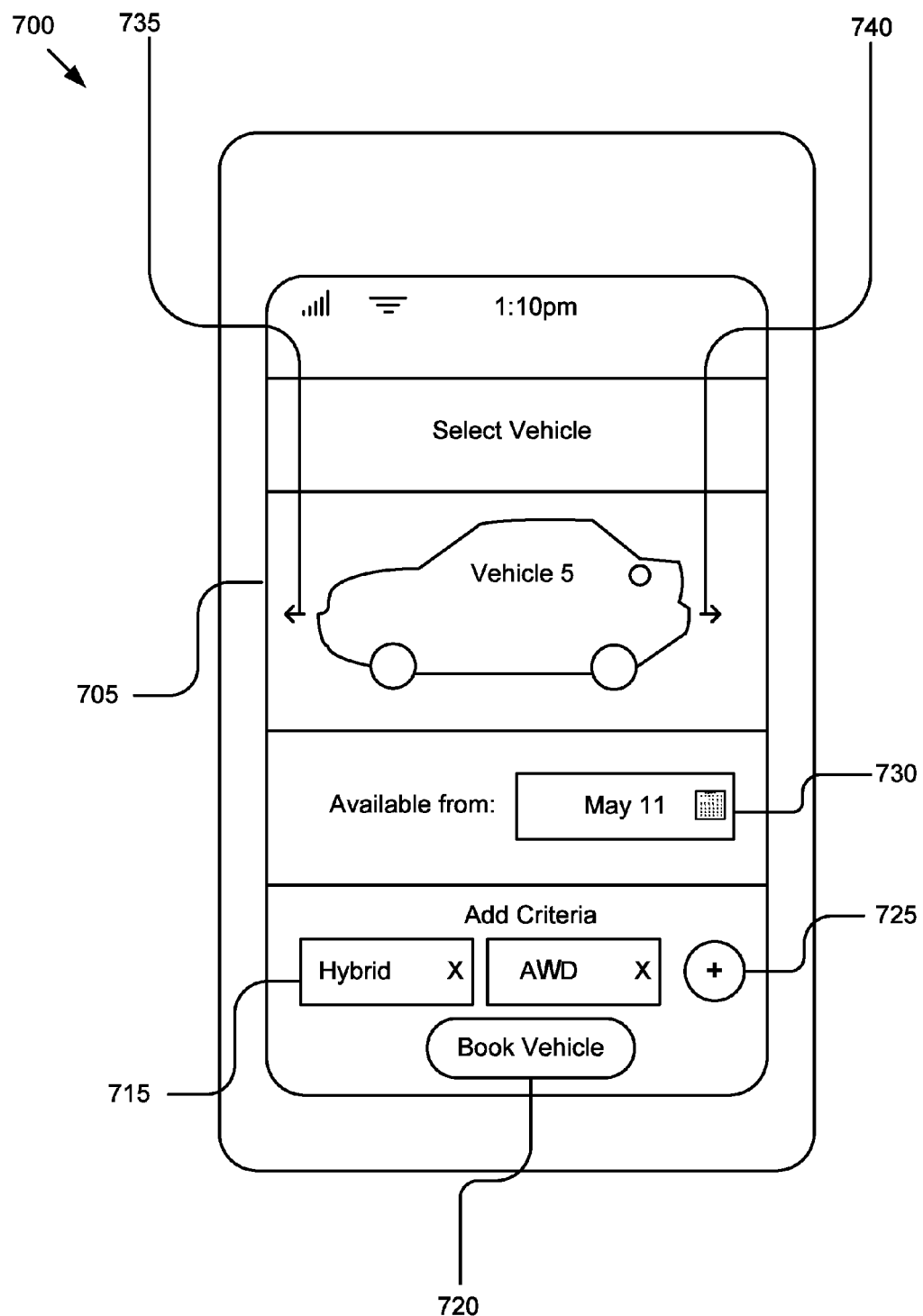

Referring now to FIGS. 7A and 7B, depicted are graphic representations of an example vehicle selection GUI 700. Referring to FIG. 7A, graphical element 705 depicts a region for selecting a vehicle. The vehicles displayed in this region may correspond to the vehicles that are available in the final service level as selected by the user 180. In other words, the vehicles available for display (and selection by the user 180) in region 705 may be limited by the final service level selection of the user 180.

Graphical elements 735 and 740 may be selected to change the currently displayed vehicle in the region 705. For example, in FIG. 7A "Vehicle 4" is displayed in region 705 but in FIG. 7B "Vehicle 5" is displayed in region 705. This may be because either graphical element 735 or graphical element 740 was selected by the user 180.

Referring back to FIG. 7A, graphical element 730 may be selected to provide a calendar input. The vehicles available for display (and selection by the user 180) in region 705 may be further narrowed by the calendar input. In this way, the available vehicles may be narrowed by a combination of the final service level selection and the calendar input.

Graphical element 725 may be used to provide criteria for the vehicles which are available for display in region 705. For example, the user 180 may require the vehicle to be all wheel drive (AWD) and hybrid. The user 180 may use graphical element 725 to provide any number of criteria. In this way, the available vehicles may be narrowed by a combination of the final service level selection, the calendar input and any criteria provided by the user 180. An example of criteria input being provided is depicted in FIG. 7B. In some embodiments, the calendar input and the service level selection may be required inputs of the user 180, whereas the one or more criteria input may be optional. Graphical element 720 may be used to provide the vehicle selection.

Referring now to FIG. 7B, the criteria are AWD and hybrid. The vehicle depicted in region 705 is now "Vehicle 5." The new vehicle depicted in region 705 may be responsive to the combination of the criteria. For example, Vehicle 5 may be equipped with a hybrid engine propulsion system and an AWD drivetrain. The different criteria inputted by graphical element 725 may be displayed by one or more graphical elements 715. There may be one graphical element 715 for each criteria provided by the user 180. The graphical element 715 may be selectable to remove the criteria. For example, the user 180 may select the "X" located on the right-hand side of the graphical element 715. If the user 180 wants to select Vehicle 5 then the user 180 may select element 720.

Figure 8B:
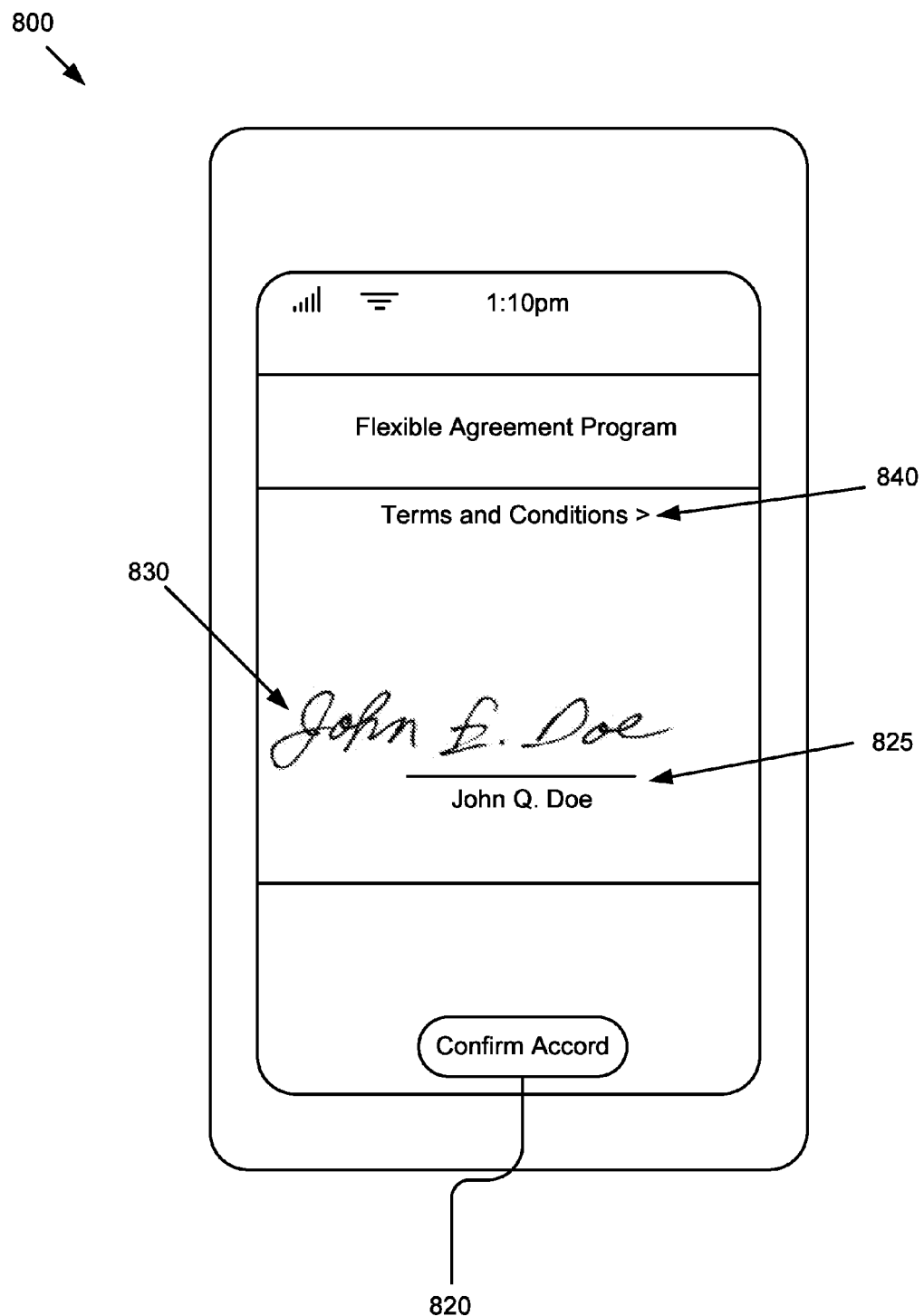

Referring now to FIGS. 8A and 8B, depicted are graphic representations of an example accord confirmation GUI 800. Referring to FIG. 8A, graphical element 840 may be selected to display the terms and conditions of the agreement. Graphical element 825 may be configured to receive an electronic handwritten signature of the user 180. Graphical element 820 may be used to provide the accord input indicating assent to the agreement.

Referring now to FIG. 8B, graphical element 840 may be selected to display the terms and conditions of the agreement. Graphical element 825 may be configured to receive an electronic handwritten signature of the user 180. Graphical element 830 may be the graphical depiction of the electronic handwritten signature of the user 180. For example, the user 180 may use their finger to provide a signature to the touchscreen 290 of the client 103. Graphical element 820 may be used to provide the accord input indicating assent to the agreement. For example, the user 180 may select graphical element 820 after providing their signature.

Figure 9:
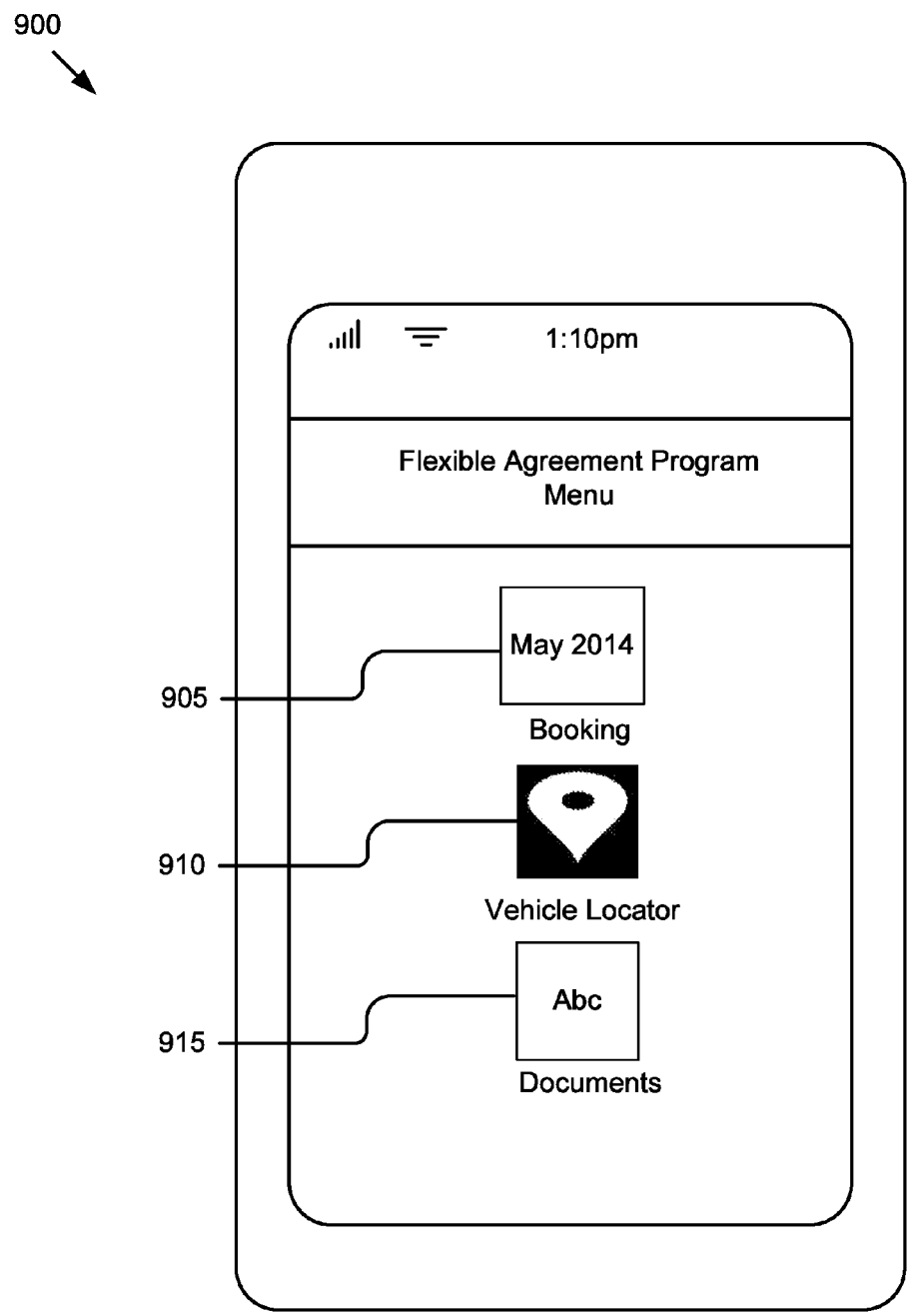
FIG. 9 is a graphic representation of an example menu graphical user interface.
Figure 13:
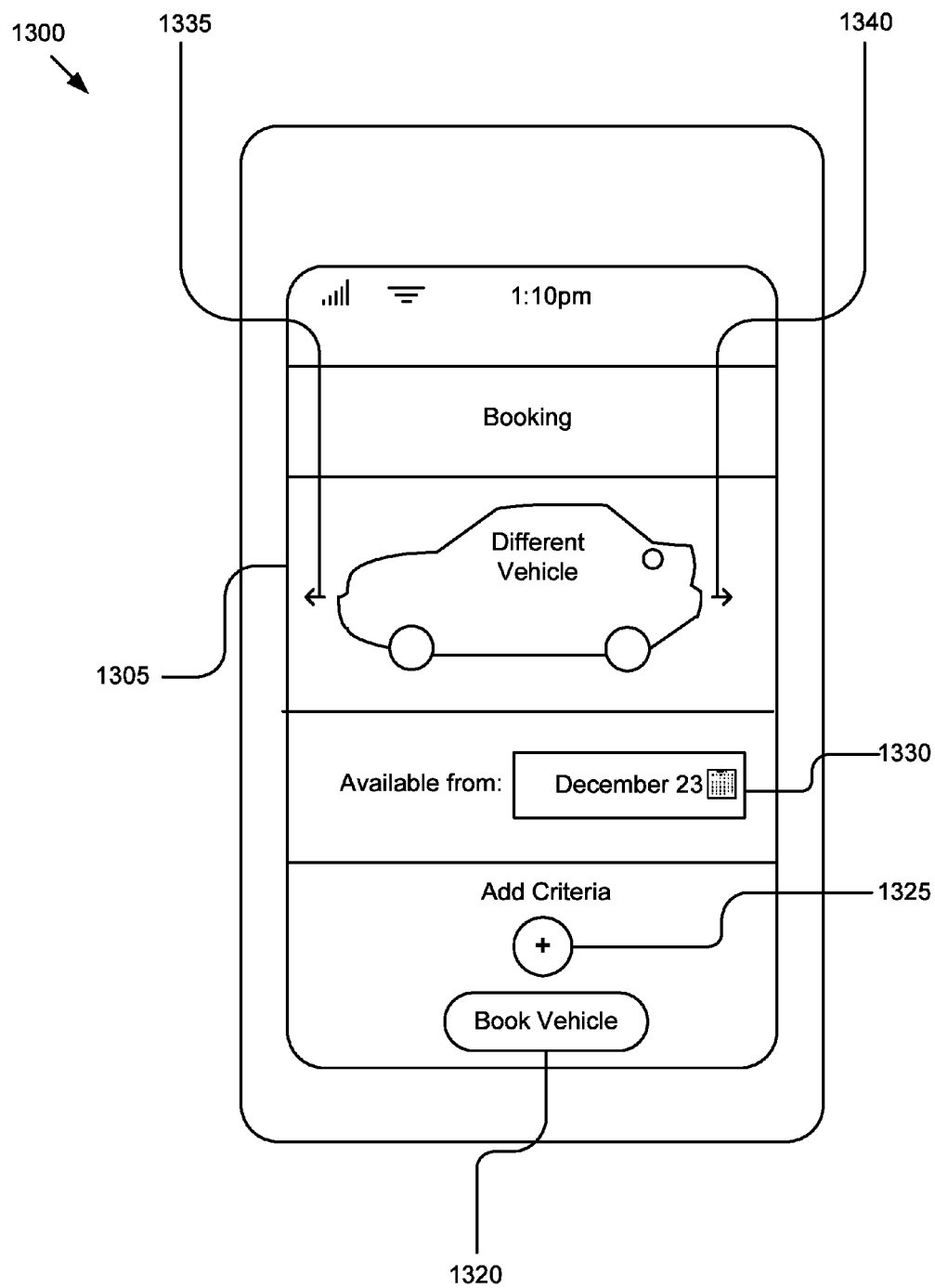
FIG. 13 is a graphic representation of an example vehicle booking graphical user interface.

Referring now to FIG. 9, depicted is a graphic representation of an example menu GUI 900. Graphical element 905 may be used to book a new vehicle. For example, assume that the user 180 leased a 123. After a period of time the user 180 desires a different vehicle. The user 180 may select graphical element 905 to book the different vehicle. In some implementations, the user 180 may select graphical element 905 and the agreement module 197 may serve graphical data for displaying a vehicle booking GUI 1300 as depicted in FIG. 13. The graphical data may be served to the client 103 via the network 105. The user service module 199 may display the vehicle booking GUI 1300 on the touchscreen 290 of the client 103.

Graphical element 910 may be used to locate a vehicle associated with the user 180. For example, the vehicle may be associated with the effective agreement entered into by the user 180. In some implementations, the user 180 may have leased the vehicle and may use graphical element 910 to locate the vehicle in the dealer's parking lot. In some implementations, the user 180 may have used graphical element 905 to switch vehicles and the user 180 may use graphical element 910 to locate the different vehicle. In some implementations, the user 180 may select graphical element 910 and the agreement module 197 may serve graphical data for displaying a vehicle locator GUI 1100 as depicted in FIGS. 11A-11C. The graphical data may be served to the client 103 via the network 105. The user service module 199 may display the vehicle locator GUI 1100 on the touchscreen 290 of the client 103.

Graphical element 915 may be used to display one or more documents. In some implementations, the user 180 may select graphical element 915 and the agreement module 197 may serve graphical data for displaying a document library GUI 1000 as depicted in FIG. 10. The graphical data may be served to the client 103 via the network 105. The user service module 199 may display the document library GUI 1000 on the touchscreen 290 of the client 103.

Figure 10:
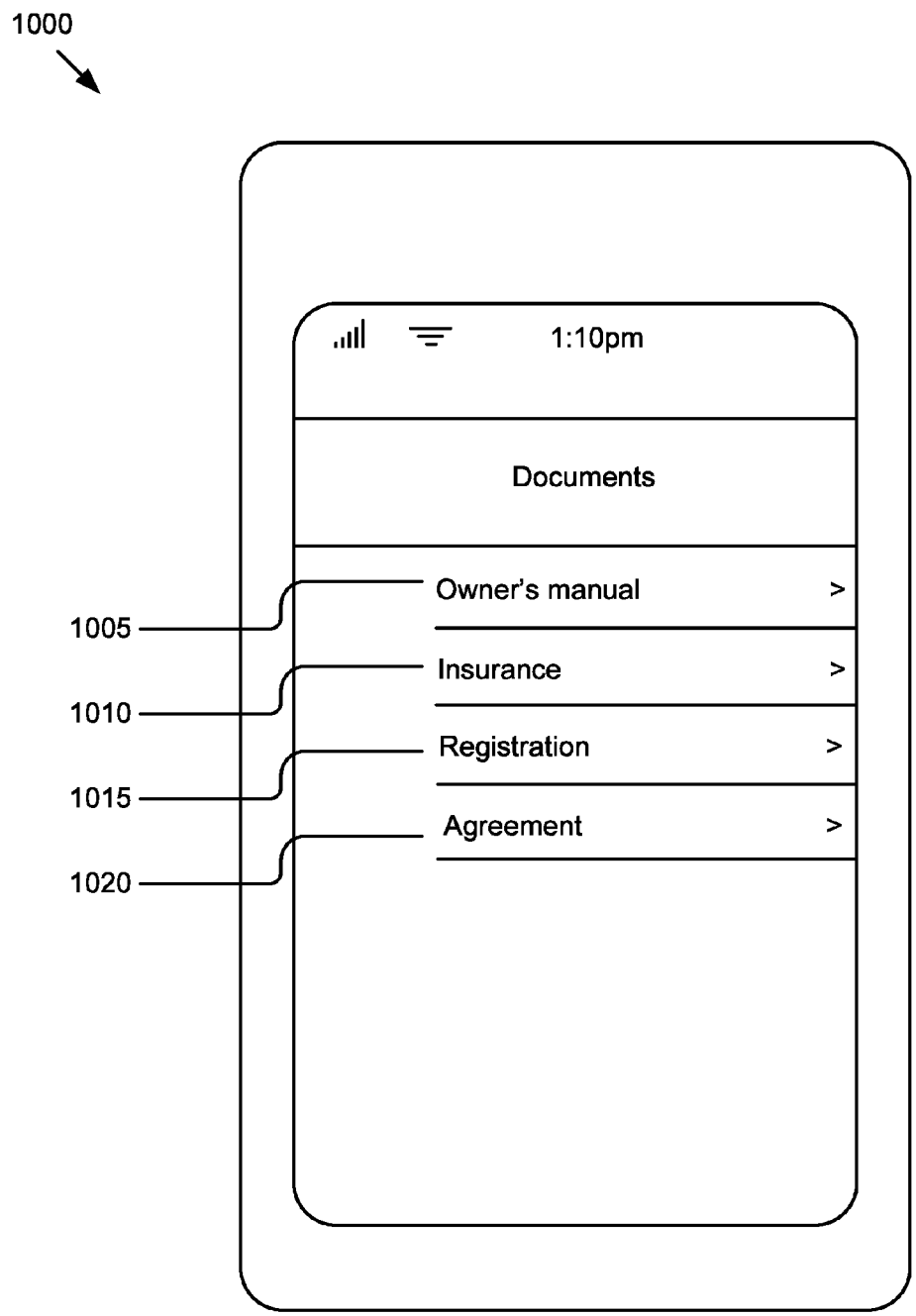
FIG. 10 is a graphic representation of an example document library graphical user interface.

Referring now to FIG. 10, depicted is a graphic representation of an example document library GUI 1000. Graphic element 1005 may be selected to display the owner's manual for the vehicle currently selected by the user 180. Graphical element 1010 may be selected to display the insurance information for the vehicle currently selected by the user 180. Graphical element 1015 may be selected to display the registration information for the vehicle. Graphical element 1020 may be selected to display an electronic copy of the effective agreement.

Referring now to FIGS. 11A-11C, depicted are graphic representations of an example vehicle locator GUI 1100. For example, the user 180 may carry the client 103. The client 103 may be a smartphone. The Bluetooth® antenna of the client 103 may be activated. The Bluetooth® antenna of the client 103 may be configured to be discoverable. The user 180 may be attempting to locate the vehicle associated with the effective agreement. The user service module 199 may use GPS or wireless signal triangulation to locate the vehicle and display the location of the vehicle on an electronic map. The Bluetooth® antenna of the vehicle may be activated. The client 103 and the vehicle may pair via Bluetooth® responsive to the client 103 coming within range of the Bluetooth® antenna of the vehicle. Responsive to detecting the pairing of the client 103 and the vehicle, the vehicle module 193 may cause the headlights or brake lights of the vehicle to blink so that the user 180 may identify the location of the vehicle. The blinking of the vehicle lights may be beneficial, for example, if the vehicle is among many other vehicles and hard to identify among the other vehicles. In some implementations, GPS may be imprecise and the blinking of the vehicle lights may assist the user 180 to identify the vehicle. The vehicle module 193 may be configured to sound a horn of the vehicle contemporaneous to blinking the vehicle lights.

In some implementations, the heads-up display unit 497 of the vehicle has a graphical display panel configured to face outwards, i.e., facing outside the vehicle and away from the interior cabin so that the graphical display is viewable outside of the vehicle. In some implementations, the outward facing graphical panel of the heads-up display unit 497 may be configured to display a personalized greeting for the user 180 responsive to the vehicle module 193 detecting the pairing of the vehicle and the client 103 via Bluetooth®. For example, the outward facing graphical panel may display a message similar to the personalized welcome GUI 1200 depicted in FIG. 12. In some implementations, responsive to the pairing of the vehicle and the client 103 via Bluetooth®, the user profile data 191 associated with the user 180 may be provided to the vehicle via the network 105. The vehicle module 193 may include graphical data for a template welcome GUI that is personalized based on the name of the user 180 as indicated by the user profile data 191. In some implementations, the user profile data 191 is provided to the vehicle responsive to other events. For example, the user profile data 191 may be provided to the vehicle by the agreement module 197 responsive to an indication of an effective agreement or the user 180 agreeing to switch vehicles.

In some implementations, the form of Bluetooth® used by the vehicle and the client 103 may be Bluetooth® LE. The vehicle may be configured to include an auxiliary battery for powering the Bluetooth® antenna of the vehicle.

In some implementations, the functionality described above for locating the vehicle and causing the vehicle system 123 to blink the vehicle lights or provide a personalized message on the outward facing graphical panel may use Wi-Fi or some other form of wireless communication instead of Bluetooth® or in combination with Bluetooth®. For example, Wi-Fi triangulation may be used instead of Bluetooth®.

Referring to FIG. 11A, graphical element 1105 may display a graphical representation of the vehicle. Graphical element 1110 may display a real time or near real time indication of how far the client 103 is from the vehicle. In this example, the client 103 is 32 feet away from the vehicle. Graphical element 1115 may display an electronic map that depicts the relative location of the vehicle and the client 103 and a path that may be taken by the user 180 in order to locate the vehicle. Graphical element 1115 may be updated in real time or near real time. Graphical element 1125 may be a graphical button selectable by the user 180 to configure whether the vehicle will blink its lights or display a message on the outward facing graphical panel. Referring to FIG. 11B, the graphical element 1125 in this example shows that the user 180 has selected to receive a message on the outward facing graphical panel. The user service module 199 may transmit the selection of the user 180 to the vehicle via the network 105 so that the vehicle module 193 takes action corresponding to the selection.

Referring to FIG. 11C, graphical elements 1110 and 1115 have been updated to indicate that the client 103 is closer to the vehicle when compared to graphical elements 1110 and 1115 of FIGS. 11A and 11B. In FIGS. 11A and 11B, the client 103 is 32 feet from the vehicle. In FIG. 11C, the client 103 is 13 feet from the vehicle.

Figure 12:
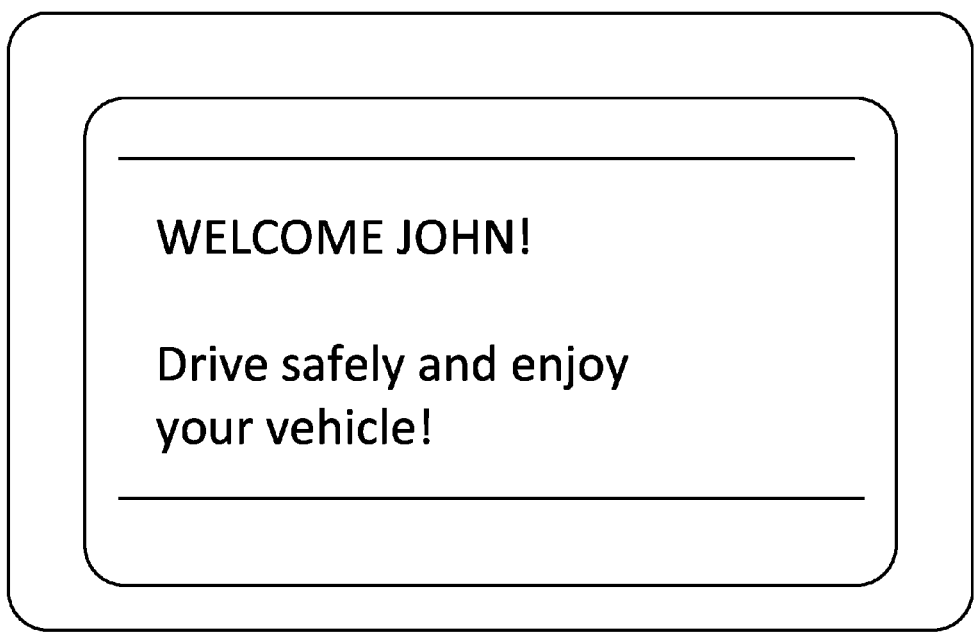
FIG. 12 is a graphic representation of an example personalized user welcome graphical user interface.

Referring to FIG. 12, depicted is a graphic representation of an example personalized user welcome GUI 1200.

Referring to FIG. 13, depicted is a graphic representation of an example vehicle booking GUI 1300. Graphical element 1305 depicts a region for selecting a new vehicle. For example, the user 180 may have entered an agreement for a first vehicle and subsequently decided to switch to a different vehicle. The first vehicle may be referred to herein as "a prior vehicle" or "the prior vehicle." The subsequent vehicle may be referred to herein as "a different vehicle" or "the different vehicle."

The vehicles displayed in this region 1305 may correspond to the vehicles that are available in the final service level as selected by the user 180. In other words, the vehicles available for display and user selection in region 1305 may be limited by the final service level selection of the user 180 so that the user 180 may not select a vehicle that is not included in the "Tier" corresponding to the final service level selection of the user 180.

Graphical elements 1335 and 1340 may be selected to change the currently displayed vehicle in the region 1305. Graphical element 1330 may be selected to provide a calendar input. The vehicles available for display and selection by the user 180 in region 1305 may be further narrowed by the calendar input. In this way, the available vehicles may be narrowed by a combination of the final service level selection and the calendar input.

Graphical element 1325 may be used to provide criteria for the vehicles which are available for display (and selection) in region 1305. In some embodiments, the calendar input and the service level selection may be required inputs of the user 180, whereas the one or more criteria input may be optional. Graphical element 1320 may be used to provide the vehicle selection for the vehicle swap. The vehicle swap confirmation GUI 1400 described below with reference to FIG. 14 may be displayed responsive to the user 180 selecting graphical element 1320.

Figure 14:
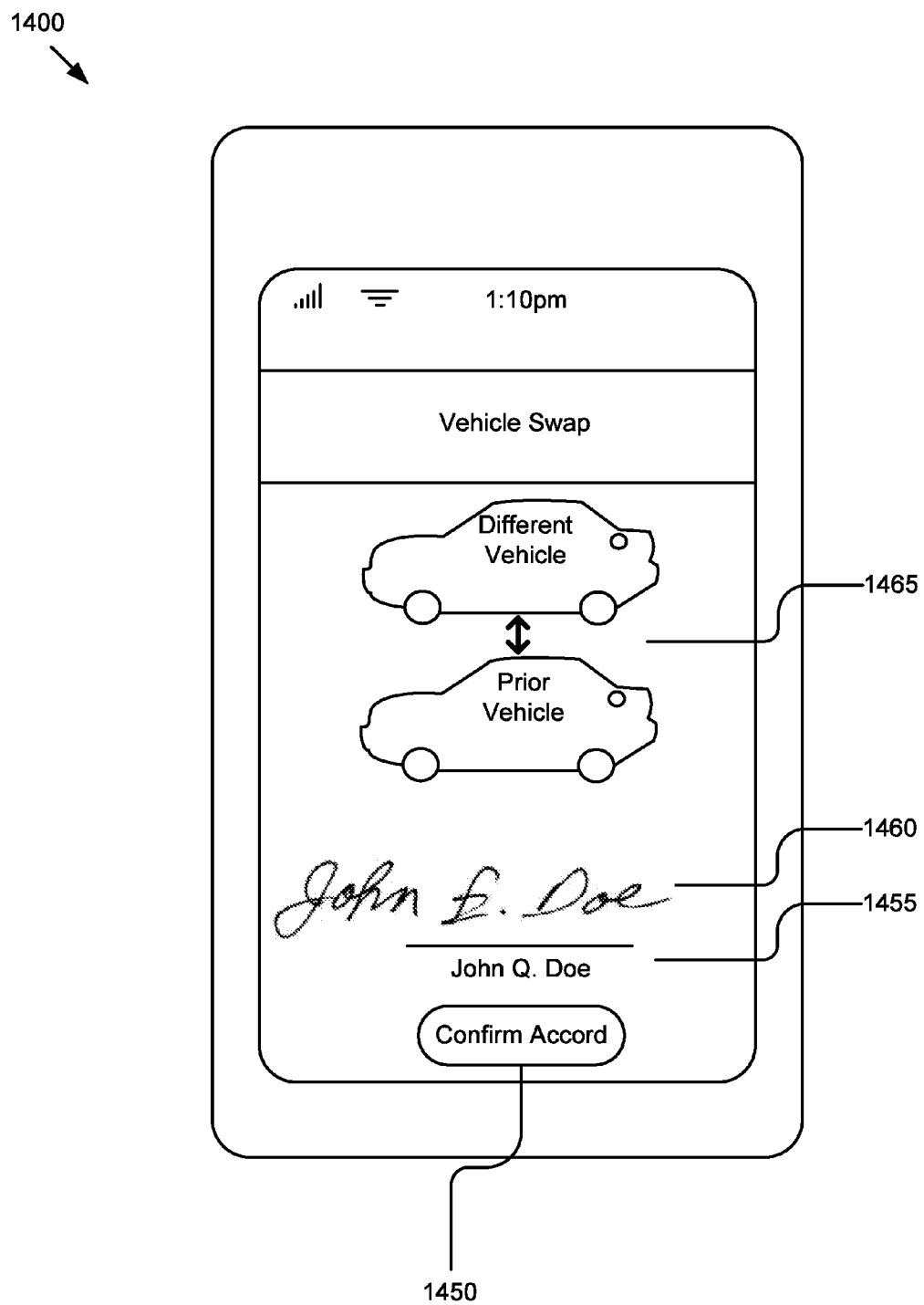
FIG. 14 is a graphic representation of an example vehicle swap confirmation graphical user interface.

Referring to FIG. 14, depicted is a graphic representation of an example vehicle swap confirmation GUI 1400. Graphical element 1465 may graphically depict the prior vehicle and the different vehicle. The user 180 may be swapping the prior vehicle for the different vehicle. The different vehicle depicted in region 1465 may be the different vehicle displayed in region 1305 of FIG. 13 at the time the user 180 selected graphical element 1320.

Referring back to FIG. 14, graphical element 1455 may be configured to receive an electronic handwritten signature of the user 180. Graphical element 1460 may be the graphical depiction of the electronic handwritten signature of the user 180. For example, the user 180 may use their finger to provide a signature to the touchscreen 290 of the client 103. Graphical element 1450 may be used to provide the accord input indicating assent to the agreement to swap the prior vehicle for the different vehicle on the date indicated by the calendar input provided by graphical element 1330 described above with reference to FIG. 13. For example, the user 180 may select graphical element 1450 after providing their signature.

Figure 15A:
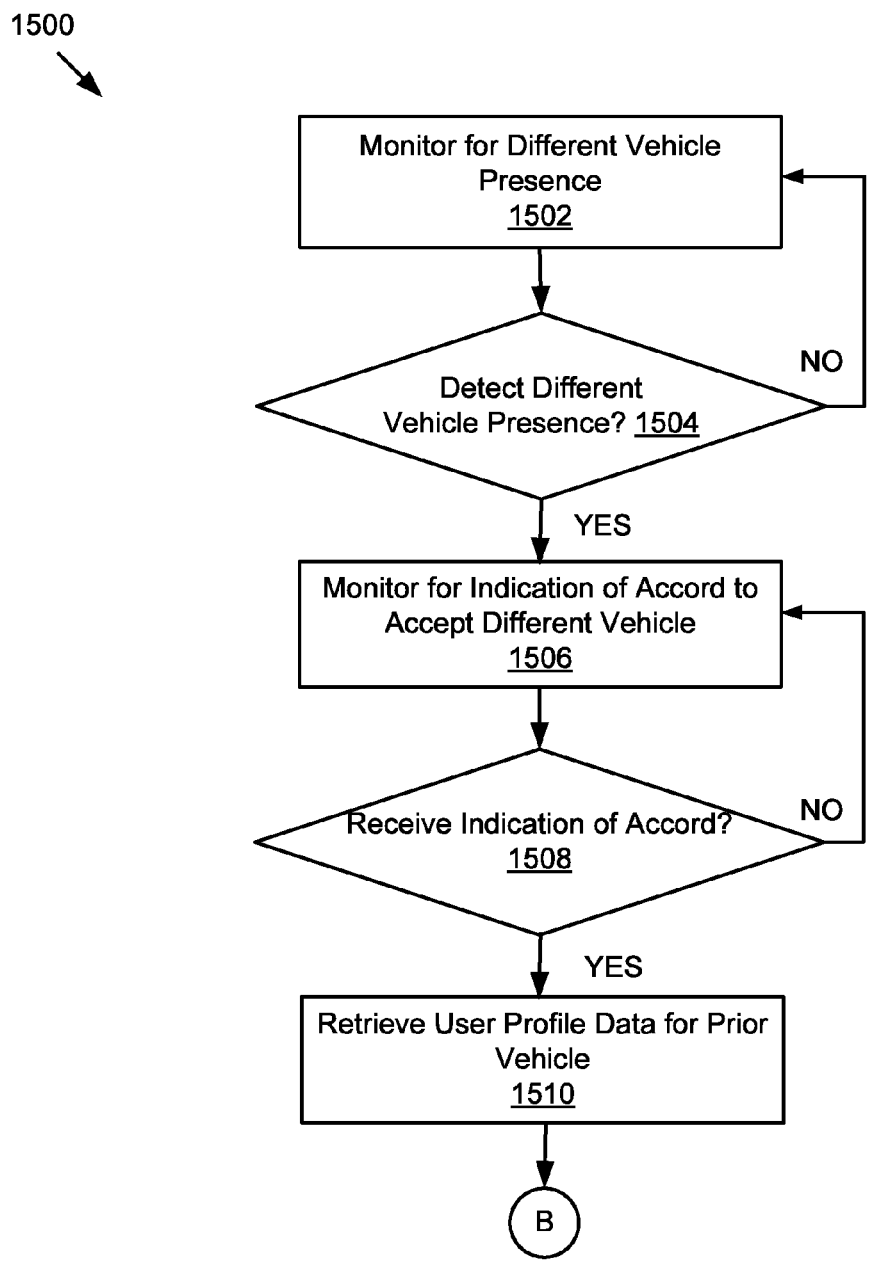
FIGS. 15A and 15B are a flowchart of an example method for synchronizing user profile data among two or more vehicles.
Figure 15B:
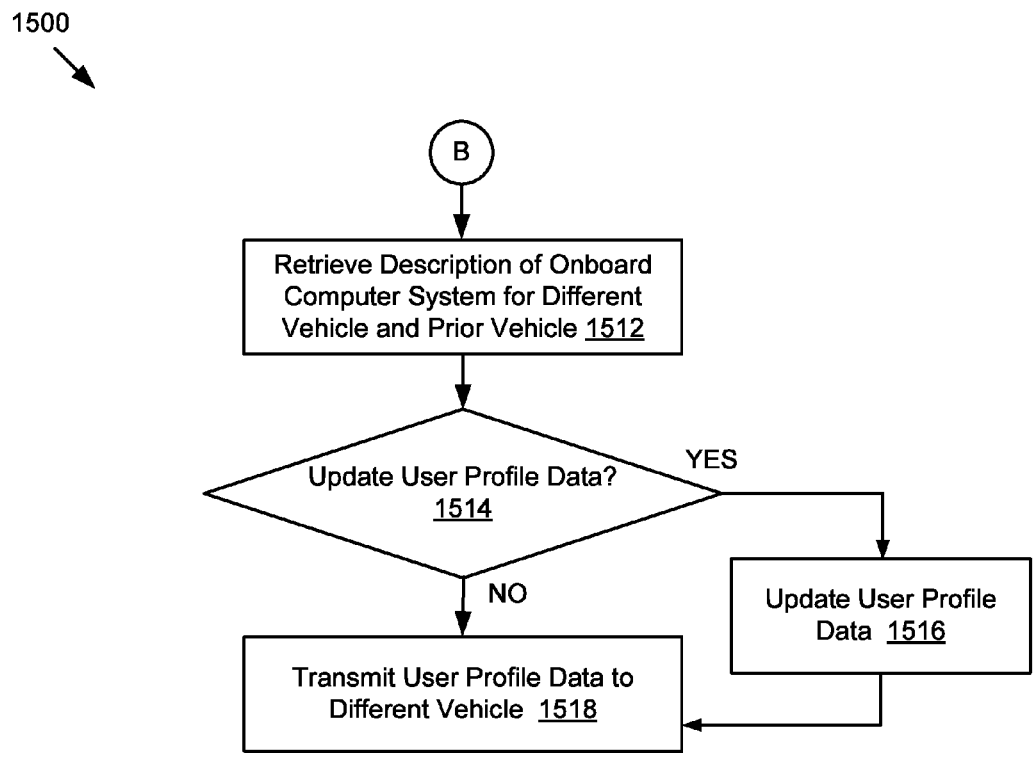

Referring now to FIGS. 15A and 15B, depicted are a flowchart of an example method 1500 for synchronizing user profile data among two or more vehicles. The method 1500 may be beneficial, for example, for use by the vehicle module 193 to monitor for a different vehicle and synchronize the user profile data with the different vehicle. In some implementations, the method 1500 may be implemented by one or more of the vehicle module 193, the agreement module 197 and the user service module 199.

At block 1502 the presence of a different vehicle is monitored. The presence of the different vehicle may be indicated by a Bluetooth® pairing between the client 103 and the vehicle.

At block 1504 a determination is made regarding whether the presence of a different vehicle is detected. If the presence of the different vehicle is not detected, the method 1500 may return to block 1502. If the presence of the different vehicle is detected, the method 1500 may proceed to block 1506.

Block 1506 may include monitoring for an indication of an accord to accept a different vehicle. For example, the user 180 may select graphical element 1450. The user service module 199 may provide a signal to indicate that the user 180 selected graphical element 1450. The client 103 may transmit the signal via the network 105. The agreement module 197 may receive the signal indicating that the user selected graphical element 1450. The agreement module 197 may store a record of the agreement on a memory such as memory 327. For example, the agreement module 197 may store the record as accord data 385. The agreement module 197 may provide a signal indicating an effective agreement. For example, the agreement module 197 may provide the signal indicating the effective agreement to the network 105. The user service module 199 may monitor for the signal indicating the effective agreement at block 1506. At block 1508 an indication of the accord may be received. For example, the user service module 199 may receive the signal indicating the effective agreement at block 1508. Alternatively, the agreement module 197 may monitor for the signal indicating the accord at block 1506 and receive the signal at block 1508.

If no indication of accord is received at block 1508, then the method 1500 may return to block 1506. If an indication of accord is received at block 1508, then the method 1500 may proceed to block 1510.

At block 1510 the user profile data 191 for the prior vehicle of the user 180 is retrieved.

Referring now to FIG. 15B, at block 1512 a description of an onboard computer system for the different vehicle and the prior vehicle may be retrieved. At block 1514, a determination is made regarding whether the user profile data 191 retrieved at block 1510 will be updated. For example, the user profile data 191 may be reformatted or otherwise updated for operation on the different vehicle. The user profile data 191 may be reformatted or updated at block 1516. At block 1518, the user profile data 191 may be transmitted to the different vehicle. In this way the user 180 may travel in the different vehicle with the benefit of the user profile data 191 that was used by the prior vehicle of the user 180.

Figure 16:
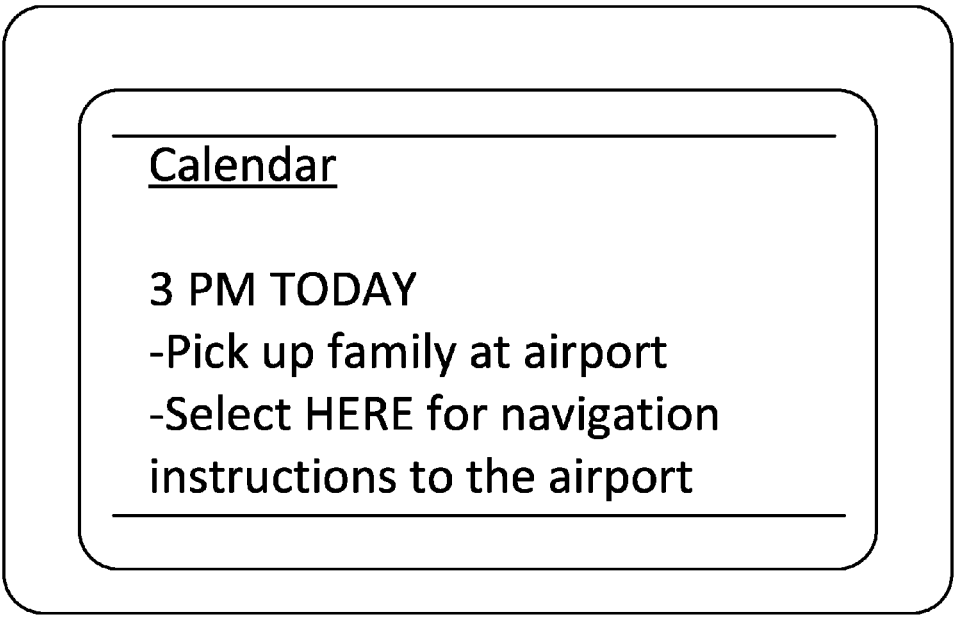
FIG. 16 is a graphic representation of an example personalized user calendar graphical user interface.

Referring now to FIG. 16, depicted is a graphic representation of an example personalized user calendar GUI 1600. For example, the user 180 may activate the different vehicle after the performance of one or more steps of the method 1500 described above with reference to FIG. 15 and access the calendar information that was previously available when traveling in the prior vehicle of the user 180. Similarly, the different vehicle will also include other features of the user profile data 191 which is now locally stored by the different vehicle.

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teachings. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a stand-alone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method of reconfiguring a second vehicle based on one or more preferences of a user without the user directly providing an input to the second vehicle to initiate the reconfiguration of the second vehicle, the method comprising:
   a second vehicle and a client pairing via Bluetooth responsive to the client coming within range of the second vehicle, wherein the client is associated with a user of a first vehicle and the client is not an element of the first vehicle or the second vehicle;
   wirelessly receiving, by the second vehicle and responsive to the pairing of the second vehicle and the client via Bluetooth, user profile data that is associated with the user and describes one or more settings of the first vehicle that indicate one or more preferences of the user;
   updating, by a processor of the second vehicle, one or more settings of the second vehicle based on the user profile data so that the second vehicle is reconfigured based on the one or more preferences of the user without the user directly providing an input to the second vehicle to initiate the reconfiguration of the second vehicle;
   responsive to the user activating the second vehicle, retrieving calendar data for an electronic calendar associated with the user, wherein the calendar data was previously displayed when the user was travelling in the first vehicle; and
   displaying the electronic calendar on a graphical display panel that is part of the second vehicle, wherein the electronic calendar includes an upcoming event and the graphical display panel also includes an option for the user to select navigation instructions to travel to a location associated with the upcoming event.

2. The method of claim 1, wherein the graphical display panel faces outwards so that it is viewable by the user when the user is outside the second vehicle and wherein the graphical display panel displays a message for the user responsive to the pairing of the client and the second vehicle.

3. The method of claim 1, wherein the user profile data includes a description of one or more ergonomic settings of the first vehicle and the method further comprises reconfiguring the second vehicle based on the ergonomic settings of the first vehicle.

4. The method of claim 3, wherein reconfiguring the second vehicle includes activating and controlling an electric motor of the second vehicle to reconfigure a part of the second vehicle to replicate or approximate the ergonomic settings of the first vehicle in the second vehicle.

5. The method of claim 1, wherein the user profile data includes device pairings data and the method further comprises reconfiguring the second vehicle to automatically pair with one or more Bluetooth enabled devices which the user previously paired with the first vehicle.

6. The method of claim 1, wherein the user profile data includes user account information for one or more network services associated with the user and the method further comprises reconfiguring the second vehicle to be able to stream the one or more network services to the second vehicle.

7. The method of claim 1, wherein the user profile data includes one or more radio station presets of the first vehicle and the method further comprises reconfiguring an infotainment system of the second vehicle to include the one or more radio station presets.

8. The method of claim 1, wherein the user profile data includes one or more settings for a navigation system and the method further comprises reconfiguring the navigation system of the second vehicle based on the one or more settings for the navigation system.

9. The method of claim 8, wherein the one or more settings for the navigation system include a home address associated with the user.

10. The method of claim 1, further comprising:
    providing an indication of a location of the second vehicle responsive to the pairing of the client and the second vehicle via Bluetooth.

11. The method of claim 10, wherein the indication of the location of the second vehicle includes the second vehicle automatically flashing lights of the second vehicle.

12. The method of claim 10, wherein the indication of the location of the second vehicle includes displaying a personalized message for the user on an outward facing panel of a heads-up display unit of the second vehicle.

13. A non-transitory computer-readable medium having computer instructions stored thereon that are executable by a processing device to perform or control performance of operations for reconfiguring a second vehicle based on one or more preferences of a user without the user directly providing an input to the second vehicle to initiate the reconfiguration of the second vehicle, the operations comprising:

detecting a presence of a client associated with a user based on a second vehicle pairing with the client via Bluetooth;

wirelessly receiving user profile data at a second vehicle responsive to the second vehicle pairing with the client via Bluetooth, wherein the user profile data is associated with the user of a first vehicle and the client and describes one or more settings of the first vehicle that indicate one or more preferences of the user;

updating one or more settings of the second vehicle based on the user profile data so that the second vehicle is reconfigured based on the one or more preferences of the user without the user directly providing an input to the second vehicle to initiate the reconfiguration of the second vehicle;

providing an indication of a location of the second vehicle to the user;

responsive to the user activating the second vehicle, retrieving calendar data for an electronic calendar associated with the user, wherein the calendar data was previously displayed when the user was travelling in the first vehicle; and displaying the electronic calendar on a graphical display panel that is part of the second vehicle, wherein the electronic calendar includes an upcoming event and the graphical display panel also includes an option for the user to select navigation instructions to travel to a location associated with the upcoming event.

14. The non-transitory medium of claim 13, wherein the indication includes a graphic displayed on the graphical panel display that is viewable by the user.

15. The non-transitory medium of claim 13, wherein the user profile data includes a description of one or more ergonomic settings of the first vehicle and the operations further comprise reconfiguring the second vehicle based on the ergonomic settings of the first vehicle.

16. The non-transitory medium of claim 13, wherein the user profile data includes device pairings data and the operations further comprise reconfiguring the second vehicle to automatically pair with one or more Bluetooth enabled devices which the user previously paired with the first vehicle.

17. The non-transitory medium of claim 13, wherein the user profile data includes user account information for one or more network services associated with the user and the operations further comprise reconfiguring the second vehicle to be able to stream the one or more network services to the second vehicle.

18. The non-transitory medium of claim 13, wherein the user profile data includes one or more radio station presets of the first vehicle and the operations further comprise reconfiguring an infotainment system of the second vehicle to include the one or more radio station presets.

19. The non-transitory medium of claim 13, wherein the user profile data includes one or more settings for a navigation system and the operations further comprise reconfiguring the navigation system of the second vehicle based on the one or more settings for the navigation system.

* * * * *